US010545658B2

(12) United States Patent
Pokrzywka

(10) Patent No.: US 10,545,658 B2
(45) Date of Patent: Jan. 28, 2020

(54) OBJECT PROCESSING AND SELECTION GESTURES FOR FORMING RELATIONSHIPS AMONG OBJECTS IN A COLLABORATION SYSTEM

(71) Applicant: Haworth, Inc., Holland, MI (US)

(72) Inventor: Romain Pokrzywka, San Carlos, CA (US)

(73) Assignee: HAWORTH, INC., Holland, MI (US)

( * ) Notice: Subject to any disclaimer, the term of this patent is extended or adjusted under 35 U.S.C. 154(b) by 130 days.

(21) Appl. No.: 15/496,472

(22) Filed: Apr. 25, 2017

(65) Prior Publication Data
US 2018/0307406 A1 Oct. 25, 2018

(51) Int. Cl.
G06F 3/0482 (2013.01)
G06F 3/0488 (2013.01)
(52) U.S. Cl.
CPC .. *G06F 3/0488* (2013.01); *G06F 2203/04808* (2013.01)
(58) Field of Classification Search
CPC ............... G06F 3/04883; G06F 3/0482; G06F 2203/04808
See application file for complete search history.

(56) References Cited

U.S. PATENT DOCUMENTS 5,812,847 A * 9/1998 Joshi .................. G06F 9/451 719/329
8,954,862 B1 2/2015 Mabie et al.
2004/0093331 A1 5/2004 Garner et al.
2004/0243605 A1 12/2004 Bernstein et al.
2005/0262107 A1 11/2005 Bergstraesser et al.
(Continued)

FOREIGN PATENT DOCUMENTS

JP 2016012252 A 1/2016
WO 2014121209 A2 8/2014

OTHER PUBLICATIONS

Screen captures from YouTube video clip entitled "Enable Drag-and-Drop Between TreeView," 7 pages, uploaded on Oct. 27, 2010 by user "Intersoft Solutions". Retrieved from Internet: <https://www.youtube.com/watch?v=guoj1AnKu_s>.*

(Continued)

*Primary Examiner* — Jennifer N To
*Assistant Examiner* — Amy P Hoang
(74) *Attorney, Agent, or Firm* — Haynes Beffel & Wolfeld LLP

(57) ABSTRACT

An electronic whiteboard that displays a viewport into a workspace shared in a networked collaboration system is supported by a data structure referred to as a relationship record, which identifies a source object, a target object, and a type of relationship. In an attachment type relationship, the location of the source object is determined relative to the location of the target object. Therefore, input gestures that identify the target object, and move or resize the target object, result in a corresponding movement or resizing of the source object. Input gestures that identify the source object can be used to reposition the source object relative to the target object, or to disconnect the source object from the target object. Also, input gestures can be utilized to connect a source object to a target object in a relationship record.

15 Claims, 16 Drawing Sheets

(56) References Cited

U.S. PATENT DOCUMENTS

| | | | |
|---|---|---|---|
| 2009/0234721 A1* | 9/2009 | Bigelow | G06Q 10/10 |
| | | | 705/12 |
| 2010/0194701 A1 | 8/2010 | Hill | |
| 2011/0055773 A1* | 3/2011 | Agarawala | G06F 3/016 |
| | | | 715/863 |
| 2011/0060992 A1 | 3/2011 | Jevons et al. | |
| 2011/0197147 A1 | 8/2011 | Fai | |
| 2011/0197263 A1* | 8/2011 | Stinson | G06F 3/011 |
| | | | 726/4 |
| 2012/0169772 A1 | 7/2012 | Werner et al. | |
| 2012/0274583 A1 | 11/2012 | Haggerty | |
| 2013/0047093 A1 | 2/2013 | Reuschel et al. | |
| 2013/0093695 A1* | 4/2013 | Davidson | G06F 3/0416 |
| | | | 345/173 |
| 2013/0346878 A1 | 12/2013 | Mason | |
| 2013/0346910 A1 | 12/2013 | Mason | |
| 2014/0055400 A1 | 2/2014 | Reuschel | |
| 2014/0149901 A1 | 5/2014 | Hunter | |
| 2014/0222916 A1* | 8/2014 | Foley | G06Q 10/101 |
| | | | 709/204 |
| 2014/0223334 A1 | 8/2014 | Jensen et al. | |
| 2014/0223335 A1 | 8/2014 | Pearson | |
| 2014/0325431 A1* | 10/2014 | Vranjes | G06F 3/0481 |
| | | | 715/788 |
| 2016/0328098 A1 | 11/2016 | Santhakumar et al. | |
| 2016/0328114 A1 | 11/2016 | Santhakumar et al. | |
| 2016/0378291 A1 | 12/2016 | Pokrzywka | |

OTHER PUBLICATIONS

Masters Thesis: "The ANA Project, Development of the ANA-Core Software" Ariane Keller, Sep. 21, 2007, ETH Zurich, 92 pages.
PCT/US2018/028365—International Search Report and Written Opinion dated Jul. 31, 2018, 13 pages.

* cited by examiner

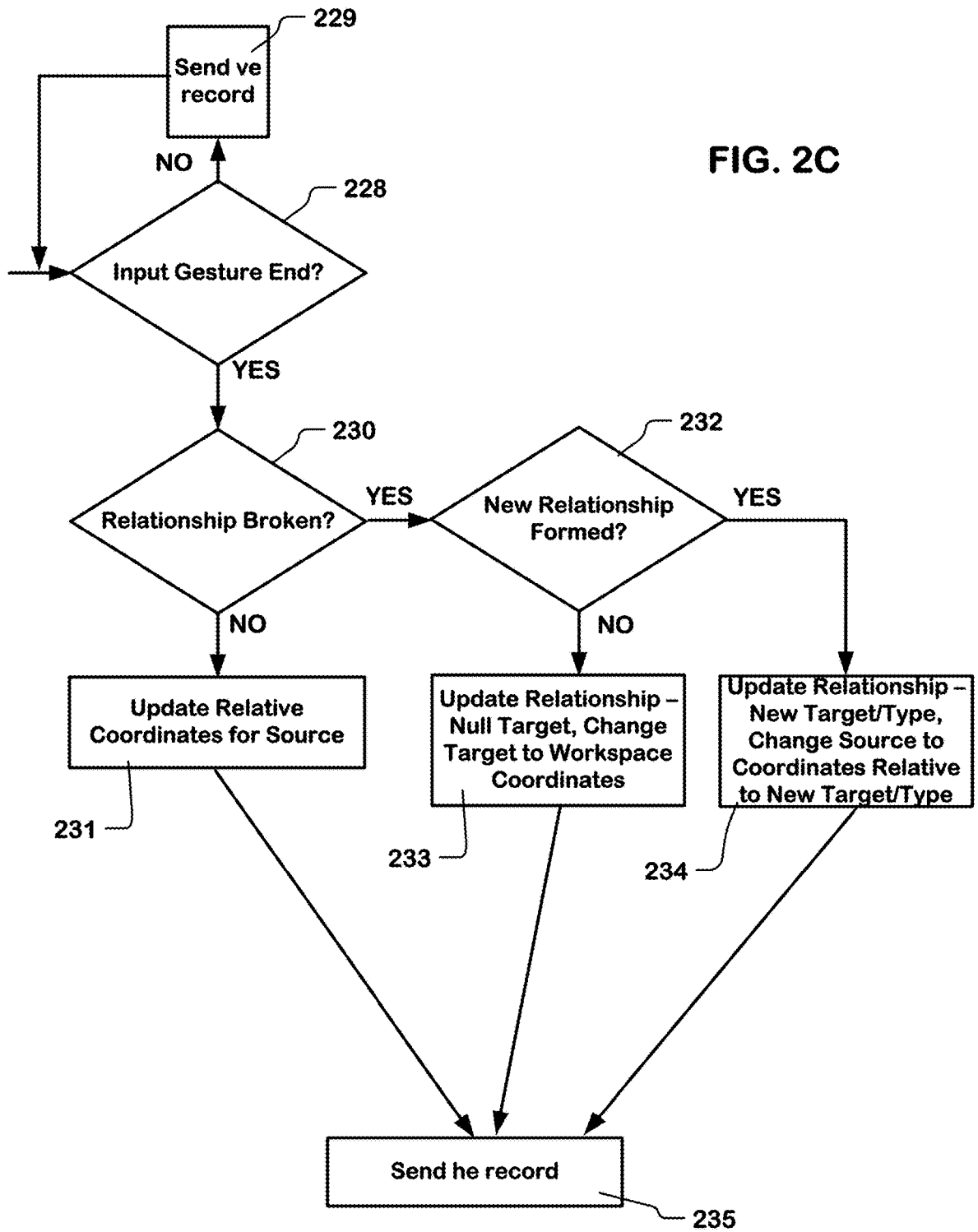

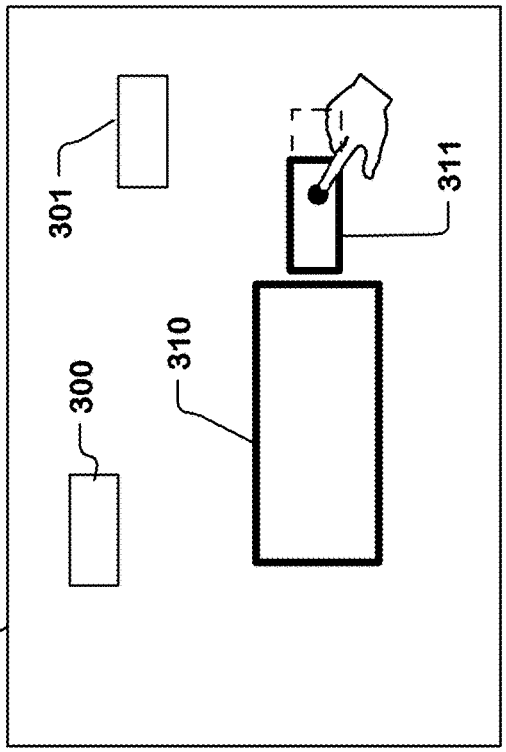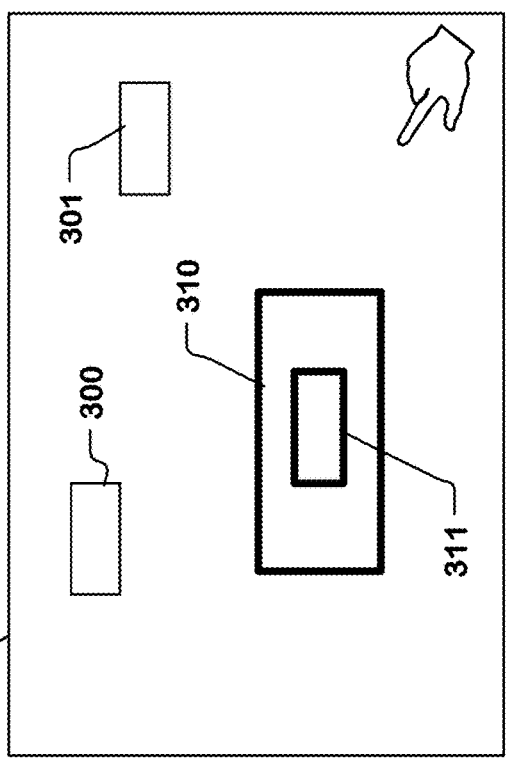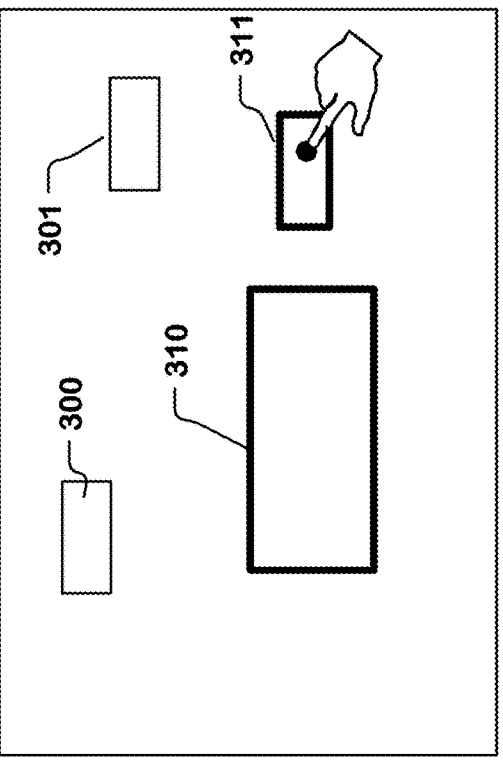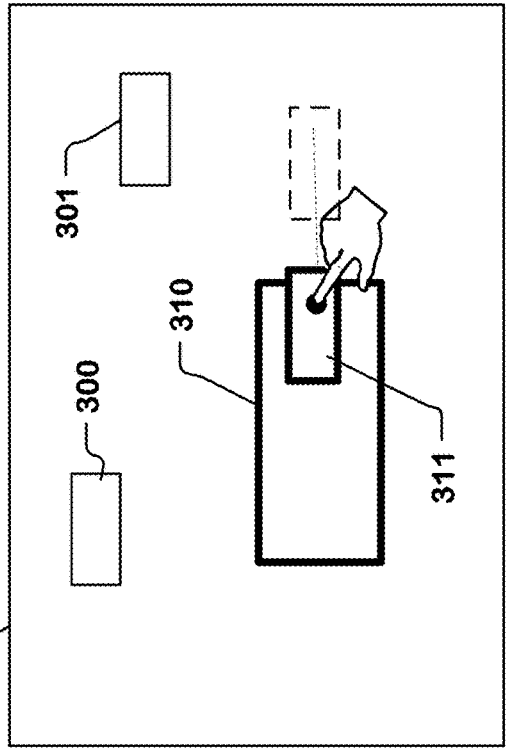

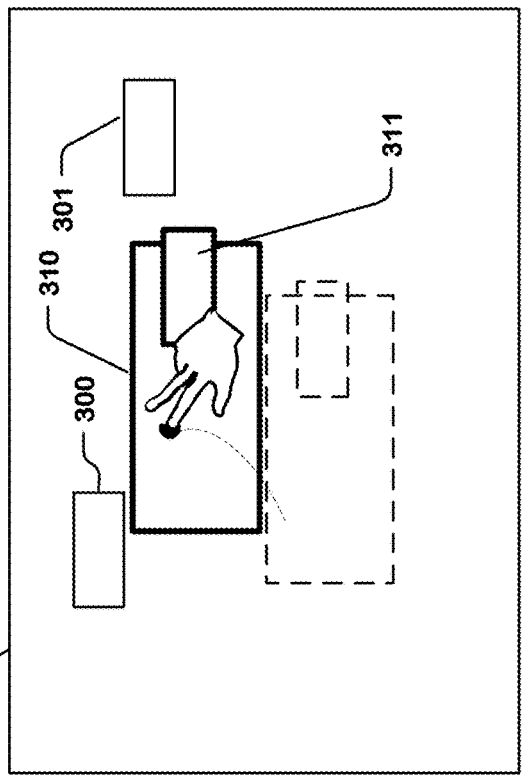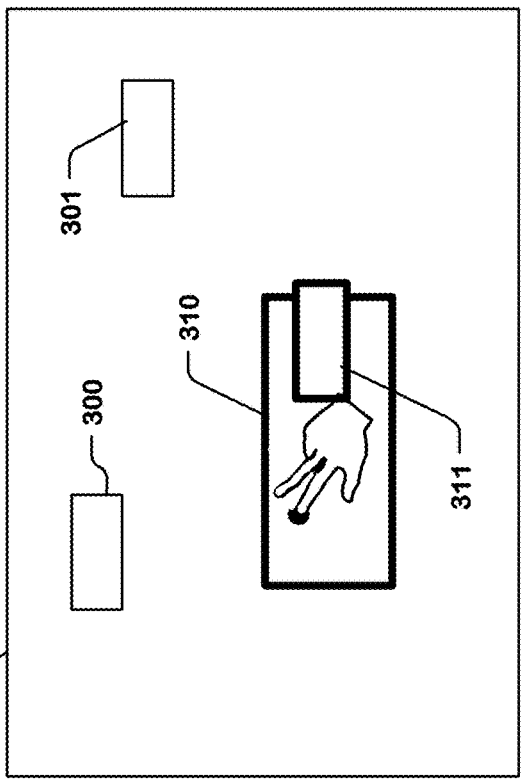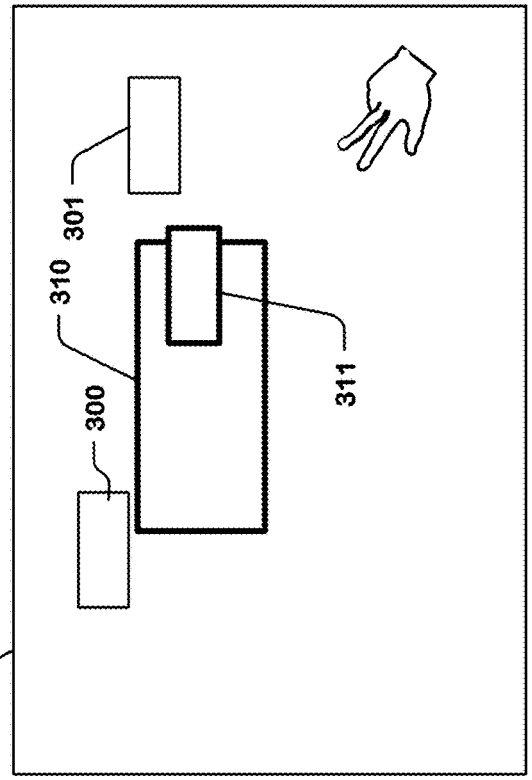

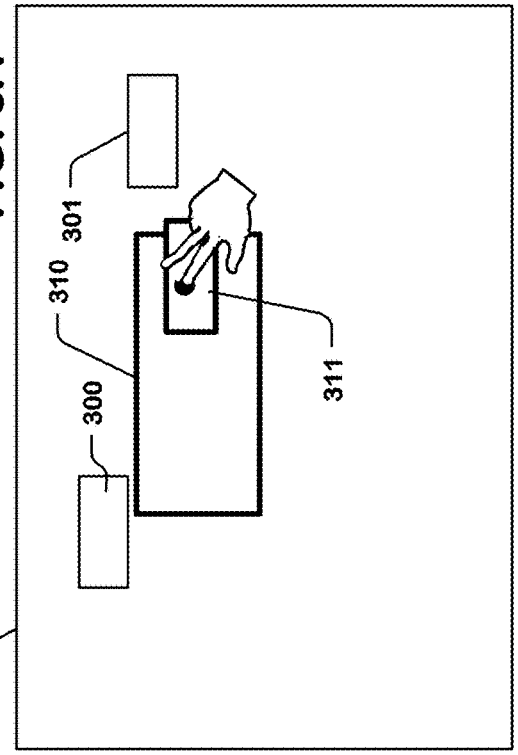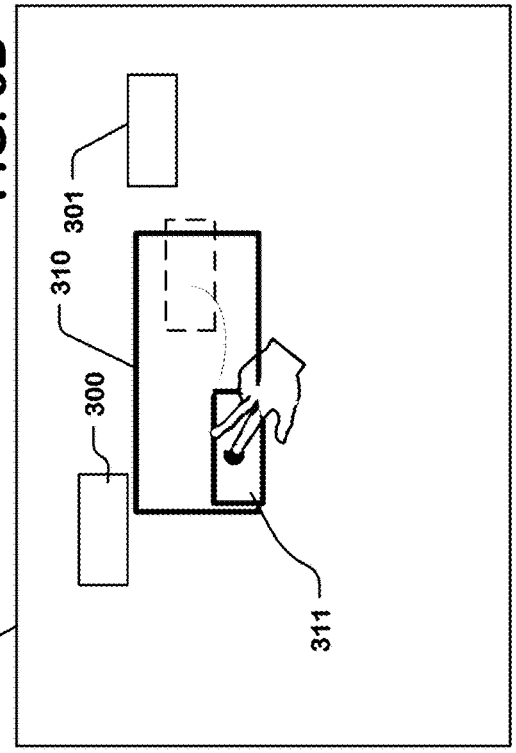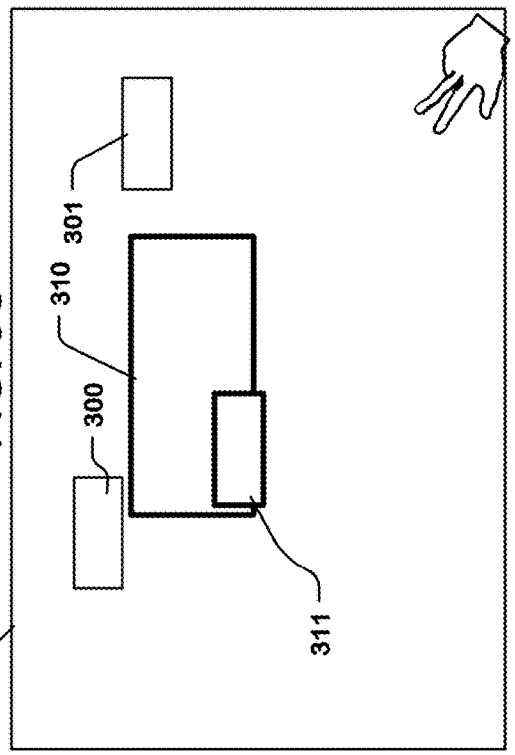

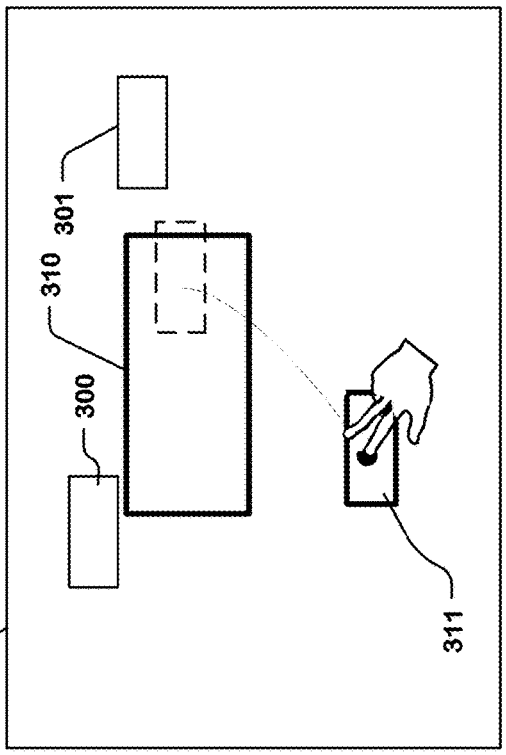
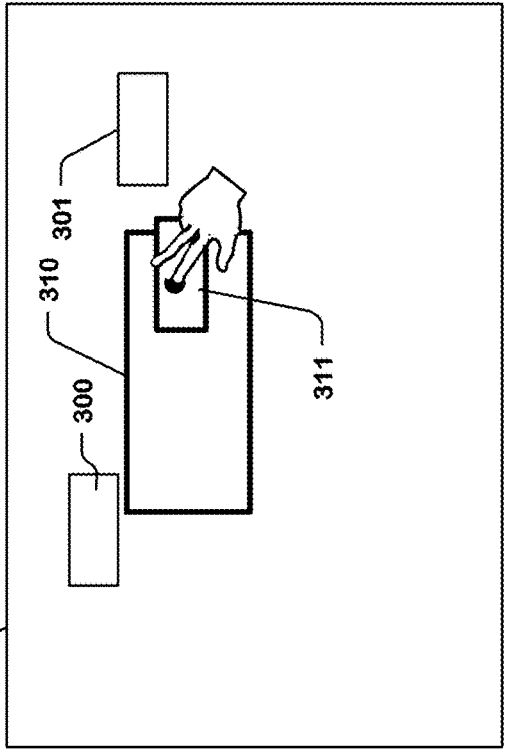
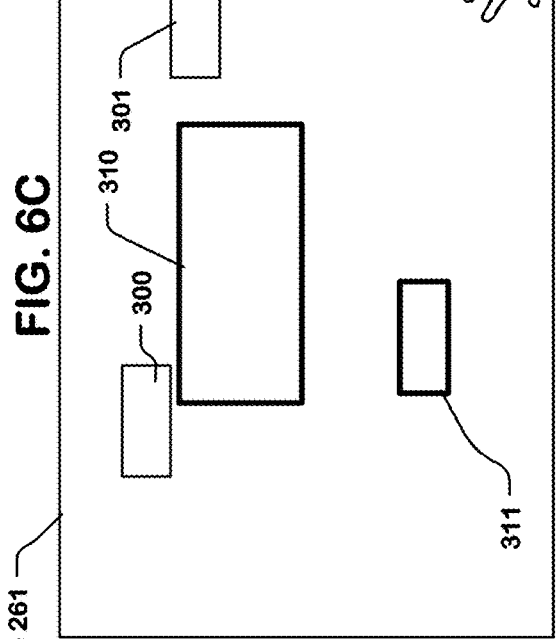

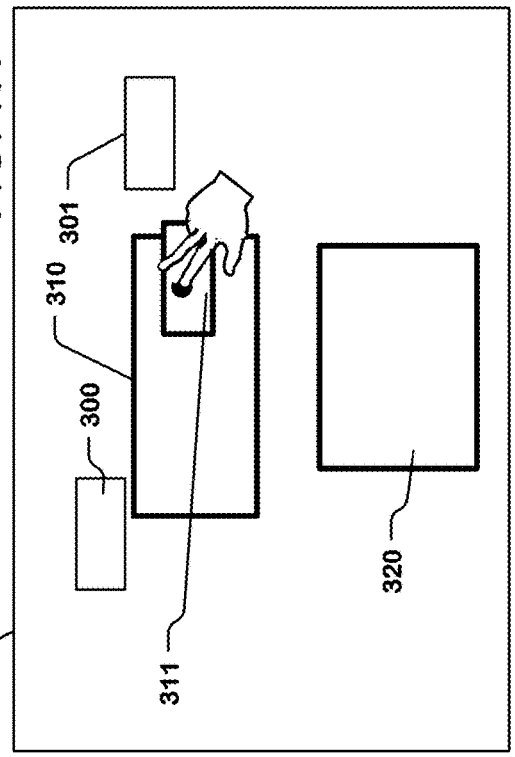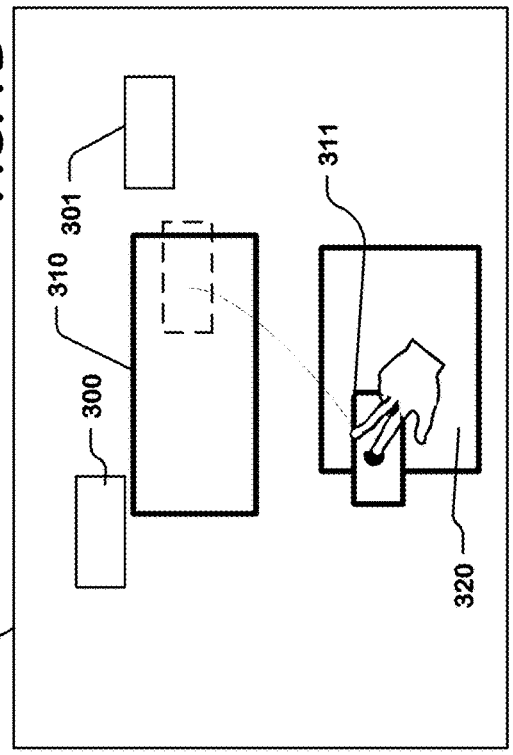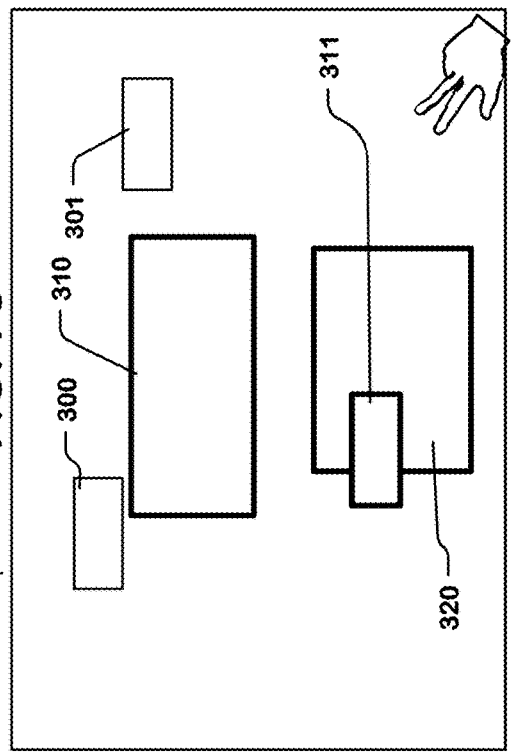

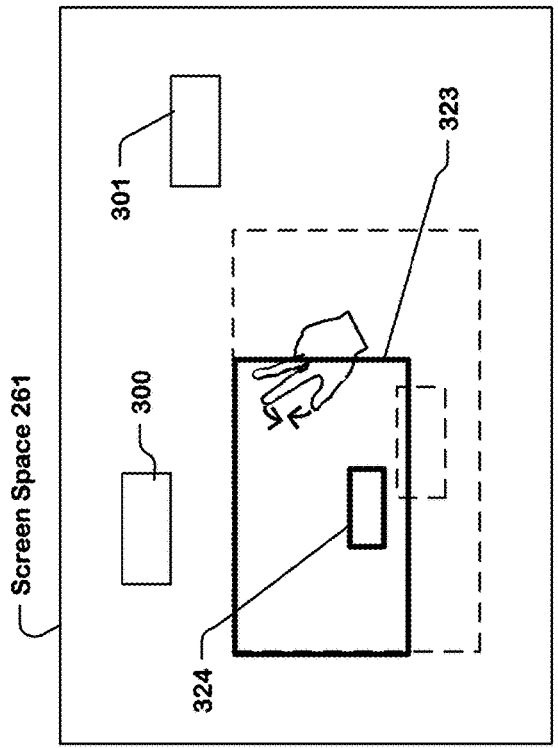
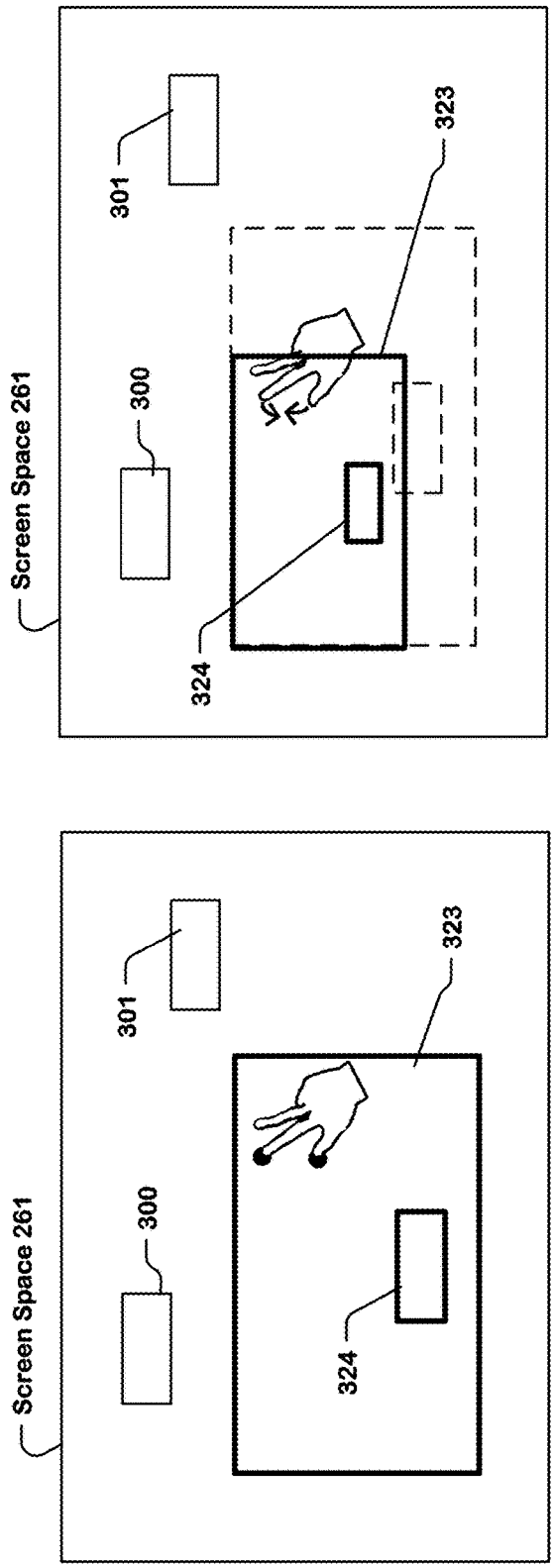
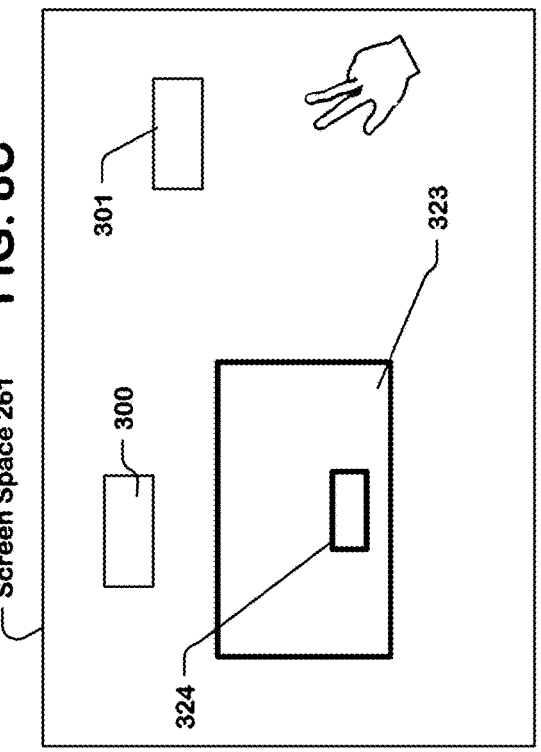

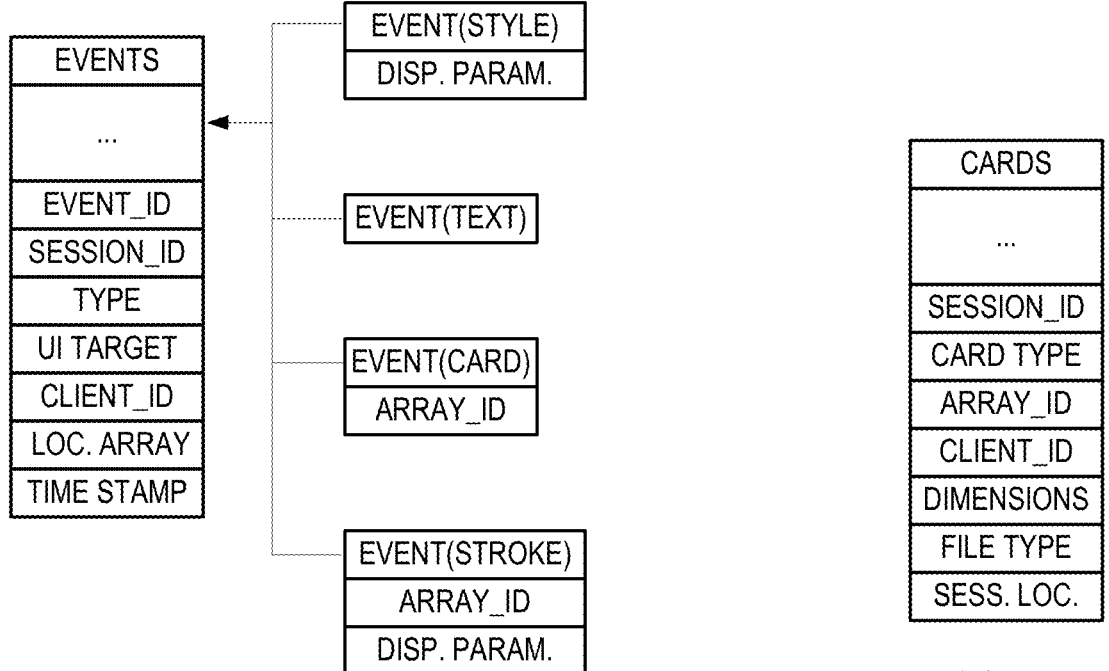
FIG. 11A
FIG. 11B
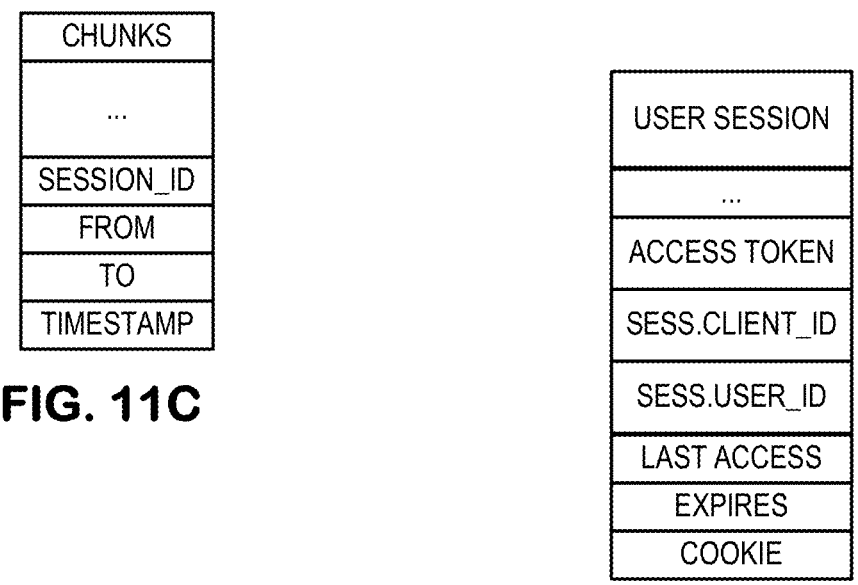
FIG. 11C
FIG. 11D

OBJECT PROCESSING AND SELECTION GESTURES FOR FORMING RELATIONSHIPS AMONG OBJECTS IN A COLLABORATION SYSTEM

RELATED APPLICATIONS

Co-pending, commonly owned, U.S. patent application Ser. No. 15/093,664, entitled "Object Group Processing and Selection Gestures for Grouping Objects in a Collaboration System," filed 7 Apr. 2016 is incorporated by reference as if fully set forth herein.

FIELD OF THE TECHNOLOGY DISCLOSED

The technology disclosed relates to methods and systems for digital collaboration, and more particularly to digital display systems that facilitate multiple simultaneous users having tools to group objects in global workspace and control operations for grouping usable in such systems.

DESCRIPTION OF RELATED ART

Digital displays, usually with touch screen overlays, can be used in a manner analogous to whiteboards. In some systems, such displays are networked and can be used for collaboration, so that modifications made to the display image on one display are replicated on another display. Collaboration systems can be configured to operate collaboration sessions in which users located at different client platforms share a workspace. The distributed nature of such systems allows multiple users in different places to interact with and change data in the same workspace at the same time, and at different times.

Collaboration systems can provide tools for interacting and managing content in the workspace. As users manipulate and position graphical objects on an electronic whiteboard, sometimes it is desirable to link objects together. Thus, in the co-pending application Ser. No. 15/093,664 mentioned above, algorithms for establishing object groups, allowing for manipulation of groups of objects are described. In order to group objects on a display, an input gesture or sequence of gestures is defined and interpreted by the displaying node. The gestures for grouping can include using touch points to define a polygon surrounding the objects to be grouped, or setting the interface in a grouping mode, and touching each of the objects to be grouped. These gestures can be disruptive, in that they can require more than one hand, or require stalling a display presentation or session to make the grouping gesture sequence.

In a shared collaboration system, the logic associated with grouping objects must be efficient, and easily shared amongst users of the whiteboard system active at the time of the grouping, and recorded in the record of the workspace so that these associations are maintained for subsequent viewing and utilization of the workspace.

It is desirable to provide for user input gestures or other signaling combinations used for establishing this association among objects in the workspace, that are easy to use and track. Also, it is desirable to provide for data structures and procedures to create control operations on the groups that are efficient of processing resources, and robust.

SUMMARY

A technology is described which allows for improved flexibility in use of an electronic whiteboard, and in particular an electronic whiteboard which displays a viewport into a workspace shared in a networked collaboration system.

The technology includes a data structure referred to as a relationship record, which defines a source object, a target object, and a type of relationship. In an attachment type relationship, the location and size of the source object are determined relative to the location and size of the target object. Therefore, input gestures that identify the target object, and move or resize the target object, result in a corresponding movement or resizing of the source object. Input gestures that identify the source object can be used to reposition the source object relative to the target object, or to disconnect the source object from the target object. Also input gestures can be utilized to connect a source object to a target object in a relationship record.

A system more generally is described comprising a network node which can be utilized in a collaboration session including a display having a physical display space, a user input device, a processor and a communication port. The network node includes logic to access a database recording contents of a workspace including a plurality of graphical objects. Entries in the database include identifiers of corresponding graphical objects in the plurality of graphical objects, locations of the corresponding graphical objects in workspace coordinates, and sizes of areas allocated to the corresponding graphical objects targets in the workspace coordinates. The database includes at least one relationship record defining a relationship between a source graphical object in the plurality of graphical objects and a target graphical object in the plurality of graphical objects. The defined relationship specifies characteristics for rendering in the screen space of the source graphical object as a function of its relationship to the target graphical object. The network node includes logic to identify graphical objects in the database having locations within a viewport in the workspace coordinates, and the relationship record. The network node includes logic to render the graphical objects corresponding to the identified entries to locations and sizes of areas within a screen space in the physical display space of the network node, including characteristics specified in the relationship record.

For an attachment relationship as described herein, the characteristics specified in the relationship record comprise a location and area for the source graphical object in the relationship record according to a function of the location and area of the target graphical object in the relationship record. In an attachment relationship, the location and size of the source object are defined by relative coordinates, relative to the location and size of the target object. Thus the location in workspace coordinates of the source object can be computed using a combination of the relative coordinates and the absolute workspace coordinates of the target object. The network node also includes logic to map the graphical objects corresponding to the entries identified as falling within the viewport, to locations within a screen space in the physical display space of the network node.

In another type of relationship, the characteristics specified in the relationship record comprise a link between the source graphical object in the relationship record to the target graphical object to be rendered in the screen space having graphical features identified in the relationship record.

The network node can also include logic to accept input data from the user input device that identifies an input gesture indicating selection of one of the source and target graphical objects in the relationship record, and indicating a termination of the input gesture. Logic can interpret the input gesture in response to the selection, the termination and the defined relationship.

A method for operating a network node according to the logic discussed above is also described.

The system can send messages including notifying recipients of the relationship record events to the one or more other network nodes in the session. The system can also send messages identifying events such as manipulation or management events, which occur for identified source and target objects of the relationship record.

The receiving network nodes of the messages can add the events to the instances of the spatial event map of the session used at their respective network nodes. If the events relate to a graphical target within the viewport and screen space of the recipient, then recipient can detect that and render the effects of the event in its screen space.

A computer program product embodying the logic or parts of the logic described herein is described, which can be stored in non-transitory computer readable memory in the server-side network node. The computer program product can be delivered via communication channels by a server to a client-side network node for use in a collaboration session, and stored in non-transitory computer readable memory in the client-side network node.

The above summary is provided in order to provide a basic understanding of some aspects of the collaboration system described herein. This summary is not intended to identify key or critical elements of the technology disclosed or to delineate a scope of the technology disclosed.

BRIEF DESCRIPTION OF THE DRAWINGS

The technology disclosed will be described with respect to specific embodiments thereof, and reference will be made to the drawings, which are not drawn to scale, and in which:

FIGS. 2B and 2C are a flowchart of operation of a client-side display driver, interpreting an input gesture relating to graphical targets subject of a relationship record.

FIGS. 3A, 3B, 3C and 3D, illustrate a sequence showing attachment of objects.

FIGS. 4A, 4B and 4C illustrate a sequence showing movement of attached objects.

FIGS. 5A, 5B and 5C illustrate a sequence showing movement of an attached child object to a changed position on a parent object.

FIGS. 6A, 6B, and 6C illustrate a sequence showing detachment of an attached child object from a parent object.

FIGS. 7A, 7B and 7C illustrate a sequence showing detachment of a child object from a first parent object, and re-attachment to a different parent object.

FIGS. 8A, 8B and 8C illustrate a sequence showing resizing of attached objects.

FIGS. 11A, 11B, 11C and 11D are simplified diagrams of data structures for parts of the workspace data for a workspace.

DETAILED DESCRIPTION

Figure 1:
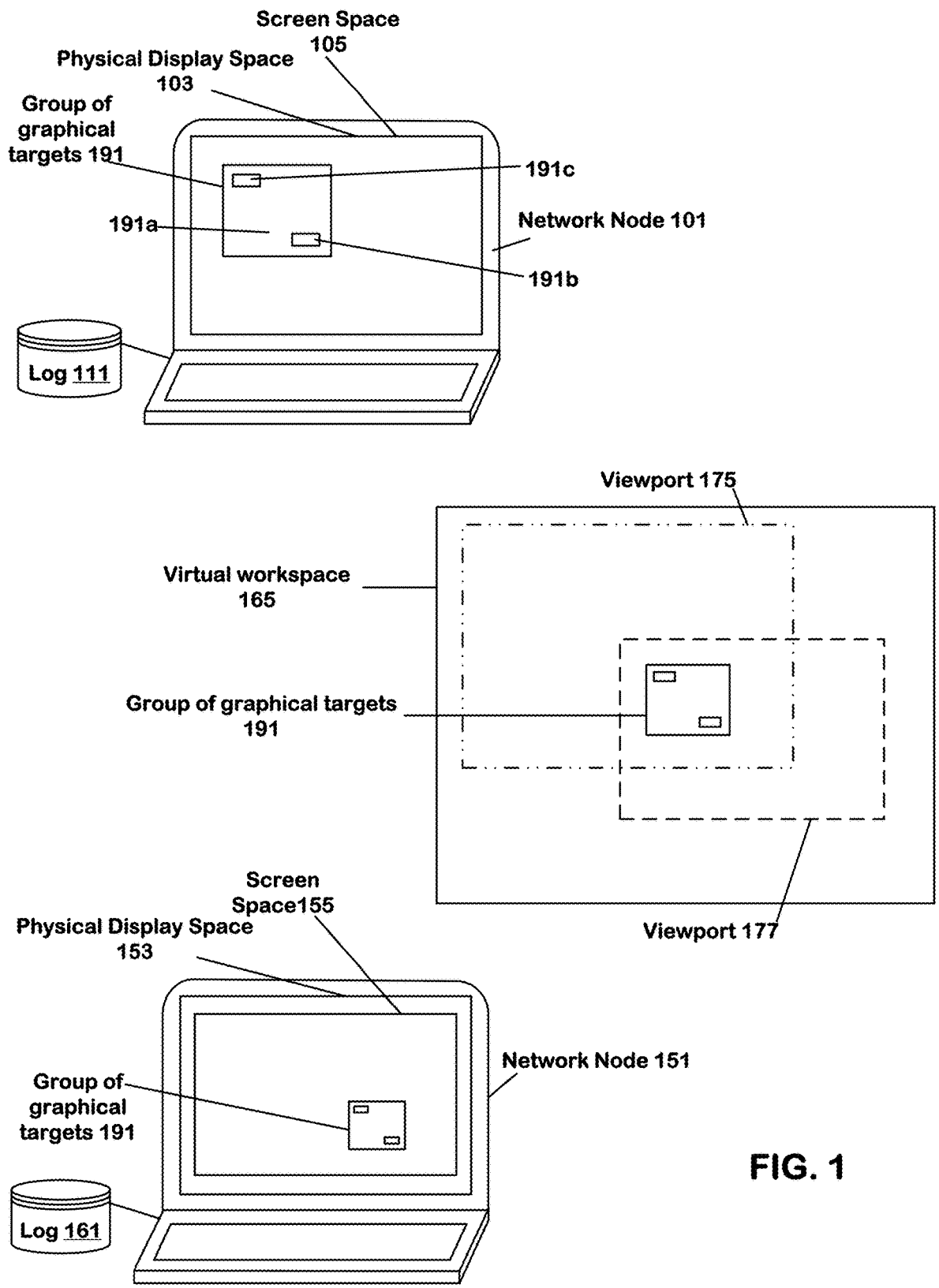
FIG. 1 illustrates a system of network nodes that collaborate within a collaborative workspace.

The following description is presented to enable any person skilled in the art to make and use the technology disclosed, and is provided in the context of a particular application and its requirements. Various modifications to the disclosed embodiments will be readily apparent to those skilled in the art, and the general principles defined herein may be applied to other embodiments and applications without departing from the spirit and scope of the technology disclosed. Thus, the technology disclosed is not intended to be limited to the embodiments shown, but is to be accorded the widest scope consistent with the principles and features disclosed herein.

The "unlimited workspace" problem includes the need to track how people and devices interact with the workspace over time. In order to solve this core problem, a Spatial Event Map, and a system architecture supporting collaboration using a plurality of spatial event maps and a plurality of collaboration groups has been described in our co-pending U.S. application Ser. No. 14/090,830, entitled "Collaboration System Including A Spatial Event Map," filed 26 Nov. 2013, which is incorporated by reference as if fully set forth herein. The Spatial Event Map contains information needed to define targets and events in a workspace. It is useful to consider the technology from the point of view of space, events, maps of events in the space, and access to the space by multiple users, including multiple simultaneous users.

Space: In order to support an unlimited amount of spatial information for a given collaboration session, we provide a way to organize a workspace termed the workspace, which can for example be characterized by a two-dimensional Cartesian plane with essentially unlimited extent in one or both of the dimensions for example, in such a way that new content can be added to the space, that content can be arranged and rearranged in the space, that a user can navigate from one part of the space to another, and that a user can easily find needed things in the space when required.

Events: Interactions with the workspace are handled as events. People, via tangible user interface devices and systems, can interact with the workspace. Events have data that can define or point to a target graphical construct to be displayed on a physical display, and an action as creation, modification, movement within the workspace and deletion of a target graphical construct, and metadata associated with them. Metadata can include information such as originator, date, time, location in the workspace, event type, security information, and other metadata.

Tracking events in a workspace enables the system to not only present the spatial events in a workspace in its current state, but to share it with multiple users on multiple displays, to share relevant external information that may pertain to the content, and understand how the spatial data evolves over time. Also, the spatial event map can have a reasonable size in terms of the amount of data needed, while also defining an unbounded workspace.

There can be several different kinds of events in the system. Events can be classified as persistent events, also referred to as history events, that are stored permanently or for a length of time required by the system for maintaining a workspace during its useful life. Events can be classified as ephemeral events that are useful or of interest for only a short time and shared live among other clients involved in the session. Persistent events may include history events stored in an undo/playback event stream, which event stream can be the same as or derived from the spatial event map of a session. Ephemeral events may include events not stored in an undo/playback event stream for the system. A spatial event map, or maps, can be used by a collaboration system to track the times and locations in the workspace in some embodiments of both persistent and ephemeral events on workspaces in the system.

Map: A map of events in the workspace can include the sum total of discrete spatial events. When the persistent spatial events for a workspace are available, then that workspace can be "mapped" to a display or screen at a client node that has screen space, where screen space as used herein refers to a displayable area of specific physical size on a screen, which can be mapped to a location (and zoom level) or area in the virtual workspace. Graphical objects located in the mapped area of the virtual workspace are to be displayed in the displayable area at the client node.

Multi-User Access: One key characteristic is that all users, or multiple users who are working on a workspace simultaneously, should be able to see the interactions of the other users in a near-real-time way. The spatial event map allows users having displays at different physical locations to experience near-real-time events, including both persistent and ephemeral events, within their respective displayable areas, for all users on any given workspace.

User manipulation of groups of graphical targets, referred to as group interactions, at client nodes, such as group creation, duplication, movement, editing, group membership modifications, deletion and other group management interactions, can be experienced as near-real-time events, including both persistent and ephemeral events, within their respective screen spaces, for all users on any given workspace. One way to associate graphic targets as a group is the attachment procedure described herein.

Widget: A widget is a graphical object which can be a target of an event included as a component of a workspace that the user can interact with or view in a screen space, e.g. Notes, Images, Clocks, Web Browsers, Video Players, Location Markers, etc. A Window is a widget that is a rectangular region with two diagonally opposite corners. Most widgets are also windows.

A collaboration system as described can be based on a workspace database, such as a spatial event map, which includes entries that locate events and the graphical targets of the events in a workspace. The spatial event map can include a log of events, where entries in the log have the location of the graphical target of the event in the workspace and a time. Also, entries in the log can include a parameter (e.g. url or actual file) identifying graphical constructs used to render the graphical target on a display. A graphical construct has a location and a dimension in the screen space when it is rendered. Server-side network nodes and client-side network nodes are described which interact to form a collaboration system by which the spatial event map can be made accessible to authorized clients, and clients can utilize the spatial event map to render local display areas, and create events that can be added to the spatial event map and shared with other clients.

The workspace associated with a specific collaboration session can be represented as an unbounded virtual area providing a frame of reference without a specified boundary, within which to locate events in time and in virtual collaboration space. The workspace can encompass a virtual area that is practically unlimited in that it has a size large enough that the likelihood of a client-side network node navigating beyond its boundaries is negligible. For example, a size encompassing a virtual area that maps to a physical display space including 1,000,000 pixels by 1,000,000 pixels can be considered practically unlimited in some settings. In some examples, the workspace is essentially "infinite" in that its size is only limited by the extent of the addressing scheme used to identify locations within the workspace. Also, the system can include a number of workspaces, where each workspace can be configured individually for access by a single user or by a user group.

The collaboration system can be configured according to an application program interface API so that the server-side network nodes and the client-side network nodes can communicate about collaboration events. Messages can be defined that identify events that create, modify or delete a graphical target having a location in the workspace and the time, and groups of graphical targets. The events can be classified as history events ("he" events) and as ephemeral, or volatile events ("ve" events), where history events are stored in the spatial event map, and ephemeral events are not permanently stored with the spatial event map but are distributed among other clients of the collaboration session.

Messages containing collaboration system operating information can be exchanged in for example an application layer including history events and ephemeral events among nodes within the collaboration system.

A collaboration system can have many distributed client nodes with displays used both to display images based on workspace data managed by a shared collaboration server, and to accept user input that can contribute to the workspace data, while enabling each display to rapidly construct an image to display based on session history, real time local input and real-time input from other client nodes.

The technology described herein may be used to implement a system and method for using touch gestures to select a plurality of objects to be grouped together and treated as a related group. A gesture comprises one or more touch points on a physical display space, where the touch point can include a motion, and where sensors at the physical display space generate data indicating the location of each touch point over time. The generated data indicates a user touch input. The gestures can include several different simultaneous touch gestures. Once objects are selected and attached, various actions may be taken that have an effect on the selected objects (e.g. copy, delete, resize, move).

FIG. 1 illustrates a system of network nodes that support collaborative interaction within a collaboration workspace. The illustration shows a first network node 101, a second network node 151 and a portion of a virtual workspace 165. In the illustrated example, the first network node 101 contains a screen space 105, with touch sensors that can perform as a user input device, and a log file 111 that can store event records defining a spatial event map or other type of data structure representing contents of a virtual workspace. The second network node 151 contains a screen space 155, with touch sensors that can also perform as a user input device, and a log file 161 that can store event records defining a spatial event map. The spatial event map can identify contents of a virtual workspace 165, which in this example contains an attached group of graphical targets 191 including a parent graphical target 191*a* and two child graphical targets 191*b*, 191*c*.

The first network node 101 displays objects within a viewport 177 into the virtual workspace 165 rendered within the screen space 105 within the physical display space 103. In this example, the screen space 105 includes the entire displayable area of, and has the same resolution as, the physical display space 103. The area identified by the coordinates of the opposing corners of the viewport 177 within the virtual workspace includes the coordinates of the attached group of objects that are graphical targets 191 of events in the collaboration, rendered within the screen space 105. The second network node 151 comprises a viewport 175 (overlapping with but different than the viewport 177) into the virtual workspace 165 that is rendered within the screen space 155 defined within the physical display space 153. In this example, the screen space 155 is a window in the physical display space, and smaller than the entire display space, and may have a different resolution than the screen space on the physical display space 153. The area identified by the coordinates of the opposing corners of the viewport 175 within the virtual workspace includes the coordinates of the group of graphical targets 191, which are rendered within the screen space 155.

The virtual workspace 165 has locations identified by coordinates relative to a reference such as a center point, and so can be unbounded. In a system of Cartesian coordinates, the center point of the virtual workspace 165 lies at coordinate (0,0). Every graphical object, which is the graphical target of an event in the collaboration session, can be defined by, or specified to have, an area within the virtual workspace, such as a rectangle having an upper left x,y coordinate and a lower right x,y coordinate.

Likewise, the viewport 175 and the viewport 177 can be defined by corresponding areas within the virtual workspace defined by the coordinate system chosen. Thus, in this example, the viewport 175 might have for example an upper left coordinate of (−1000, +600) and a lower right coordinate of (+250, −150) assuming that the center of the virtual workspace 165 lies at the center of the rectangle shown. This provides an area of 1250×750 virtual pixels having a 5×3 aspect ratio.

The screen space 155 has an area defined by the units of the display system, such as pixels and can be defined by an upper left coordinate of (0, 0) and a lower right coordinate of (+1000, −600) in screen space coordinates. This provides an area of 1000×600 screen space pixels having a 5×3 aspect ratio, with a zoom factor of ⅘ or 80% relative to the virtual workspace coordinates. A workspace pixel in the viewport 175 maps to a screen space pixel in the screen space 155 pixel by the addition of an offset from the (0,0) reference in the workspace coordinates and multiplication by the zoom factor. The zoom level, or z level, can be decreased by increasing the area of the viewport in workspace coordinates relative to the fixed screen space, or increased to include a smaller portion of the workspace within the fixed screen space by decreasing the area of the viewport in workspace coordinates relative to the screen space.

User input selecting objects in the screen space 155 can utilize screen space coordinates to interpret the events, and use translation between the screen space coordinates and virtual workspace coordinates in communication with the balance of the collaboration system.

In one implementation, a first network node 101 can recognize events that indicate graphical objects 191 having a specified relationship, such as an attachment relationship. In this implementation, a first network node 101 can send messages to other network nodes participating in the virtual workspace 165 such as a second network node 151. Messages can be generated by, and sent from the first network node 101 to the second network node 151 indicating each touch point, so that the second network node 151 can render an indicator of the touch points. In one implementation, once an attachment event occurs, the node sends messages that identify a historic event and the event is recorded.

The attachment relationship is represented by a generalized relationship record, of the type "relationship" with an attribute defining the nature of the relationship such as attachment. Events related to the relationship record can be stored in the spatial event map database in a host server and in client systems. In an embodiment described herein, the attachment relationship record includes an attachment relationship ID, which comprises the source object ID (child object) with a suffix indicating the attachment relationship, such as <childObjectId>.attachment. Thus the relationship record is indexed by the source object identifier, to facilitate search. The attachment relationship record for a given object can be created like other event objects in the spatial event map system in the first instance that given object becomes identified as a source object is attached to a target object. The relationship record can be changed using an update message every time the target of the source changes, including for example when the source becomes unattached to its current target object, and then re-attaches to the same or a different target object. Graphical objects can be a source object for more than one relationship record. Also, graphical objects can be a target object for more than one relationship record. There can be more than one type of relationship record. The technology described herein is presented with reference to an attachment relationship. Other types of relationship records can be utilized in addition or in place of the attachment relationship in embodiments of the technology adapted for particular uses.

A connector relationship record can identify a source object having a location in workspace coordinates, a target object in workspace coordinates, and a connector graphical object to be rendered by clients on the screenspace connecting the source and target objects. The connector relationship object can include parameters defining characteristics of the connector graphical object, such as anchor points, geometries such as curved or straight, colors and so on.

Relationship records, including attachment relationship records and connector relationship records, can define relationships between more than two graphical objects, including one to many relationships, many to one relationships, many to many relationships, in which the source and target attributes may be arrays of objects.

As discussed below, the events of the type "he" are stored as entries in the database with a time stamp parameter indicating the time of the event. Also, the events of the type "ve" are distributed but not stored in the persistent database. The "ve" events are used at the receiving client-side nodes to animate the movement of the object, if the local viewport overlaps with the object in the workspace.

The "he" event which creates a relationship record (source, target, type) is shared and stored in the spatial event map. Clients respond to the "he" in the event map when first parsed, or when received during a session, to update the client object location to the relative coordinates carried in the "he" message. During rendering at the client, the relationship record flags the source object for calculation of its location as a function of the relative coordinates plus an offset determined by the target object location.

The "type" parameter can be used to identify other relationships to be used in the "behavior" of the source relative to the target, where the behavior in the attachment relationship is computation of the location of the source relative to the target.

Figure 2A:
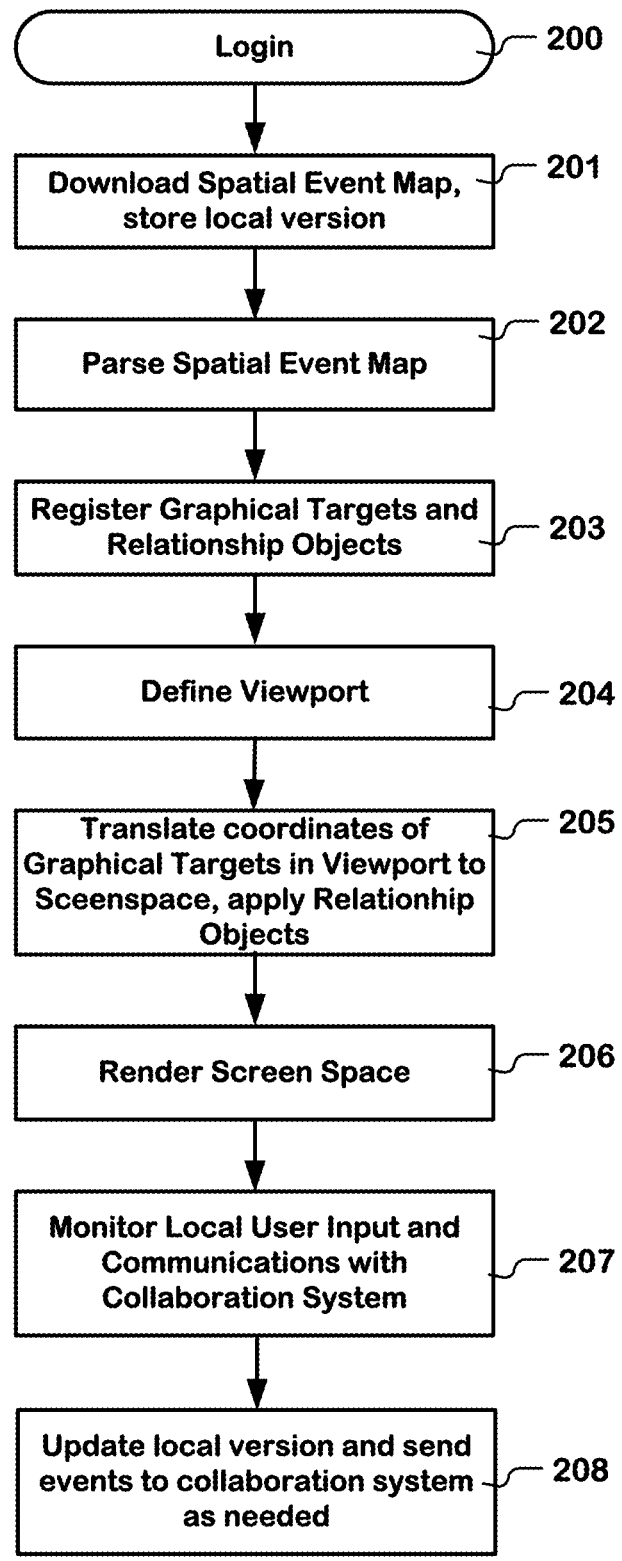
FIG. 2A is a flow chart of operation of a client-side display driver, utilizing a spatial event map with relationship records.

FIG. 2A is a flowchart showing an example of a basic operation sequence executed by logic in a client-side node, such as node 101 or 151 shown in FIG. 1. The logic can be implemented using a computer program, executed by a general-purpose processor at the client-side node or by other logic circuitry and resources available to persons skilled in data processing arts.

According to the sequence shown in FIG. 2A, the client-side node includes a driver that comprises logic used to establish a connection with a collaboration session using a login process (200). Upon successful login, and selection of a collaboration session in which to participate, the client-side node downloads a spatial event map containing a history of the events in a collaboration session and identification of the graphical targets of such events. The client-side node also can store a local version of the spatial event map (201). Next, the client-side node parses the spatial event map to identify components of the collaboration session (202) and registers the graphical targets and relationship records present in the spatial event map (203). The registration of the graphical targets and relationship records can include creation of a data structure such as a table of graphical objects that are targets of the events, and a location in a workspace coordinates for the collaboration session of the graphical objects and other parameters. Also, the registration can include formation of a data structure such as a table, that contains the relationship records indexed by identifiers of the source graphical objects in the relationship defined by the relationship record.

Upon downloading and parsing the spatial event map, and registering the graphical targets and relationship records in the spatial event map, the client-side node can define a viewport in the workspace to be rendered on the screen space to be utilized by the client-side node (204). Then, the coordinates of the graphical targets of events that fall within the viewport as indicated by the data structure created upon registration of the graphical targets are identified, or by searching the spatial event map for relevant events. Also, relationship records that define relative location of a source object relative to a target object are applied to define a location on the workspace for the source objects. The workspace coordinates of the identified objects are translated to coordinates in the screen space of the client-side node (205). Upon translation of the coordinates and location of the graphical targets within the screen space, the client-side node renders the screen space to display the objects within the viewport (206).

Upon rendering the objects within the viewport in the screen space, the local driver in the client-side note monitors local user input for gestures relating to the graphical objects within the viewport, and monitors communications with other network nodes in the collaboration system for messages that relate to the spatial event map, and to objects within the local viewport (207). Upon receipt of a local user input or a communication from another network node relevant to the collaboration, the client-side network node updates the local version of the spatial event map and registration table, and sends events to other network nodes in the collaboration system as needed (208).

With all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the technology disclosed, and it will be understood that numerous additional steps for accomplishing other functions can be performed before, after and between those shown.

Figure 2B:
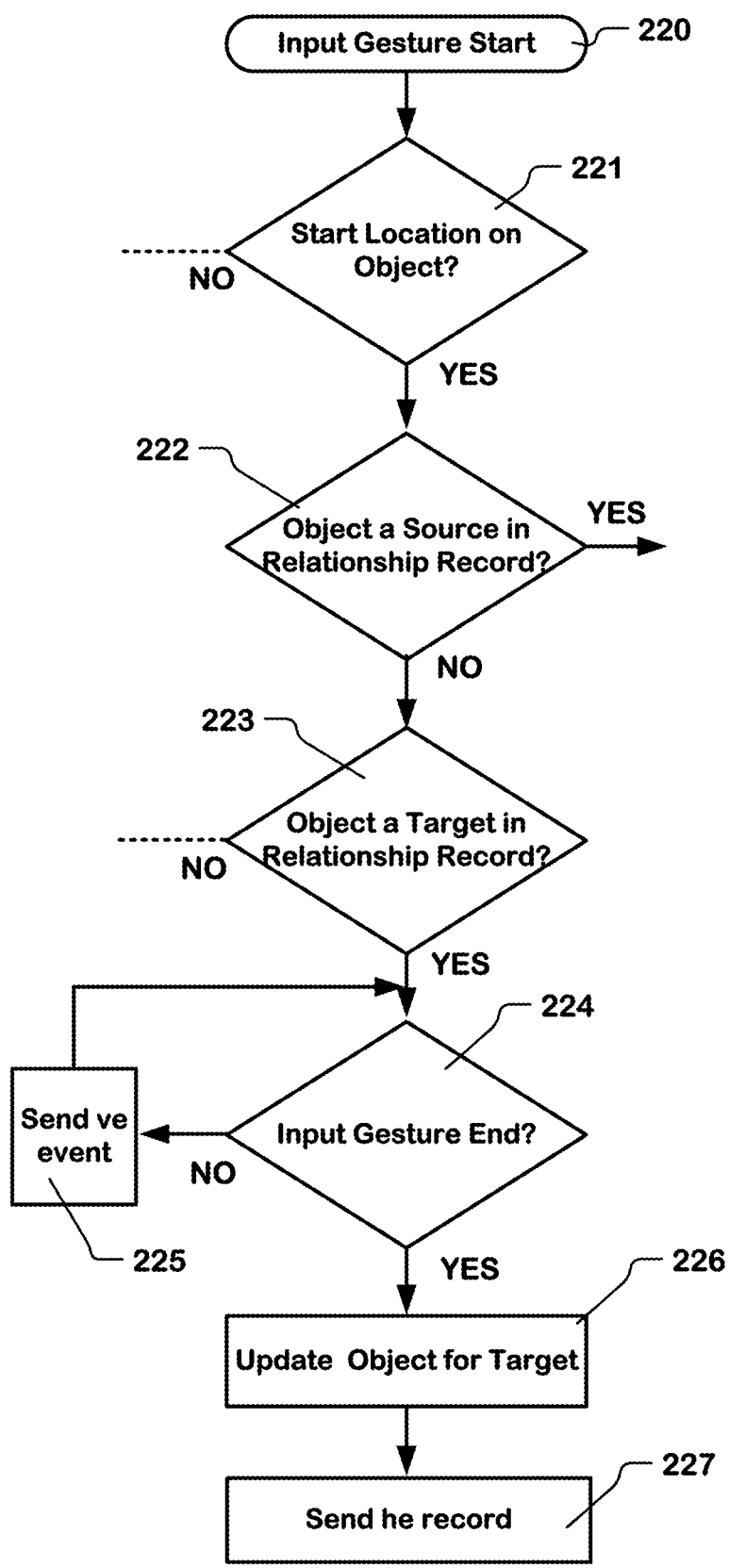

FIGS. 2B and 2C are a flowchart for logic executed by a client-side node in the interpretation of input gestures that relate to source and target objects of a relationship record. In one example, the input gesture can comprise a click and drag type gesture executed on a touch sensitive screen. The process begins on detecting the start of an input gesture (220). The driver determines whether the location of the input gesture start falls on a graphical object within the screen space (221). If not, then the input gesture is interpreted according to other rules. If the start location is located on an object, then the logic determines whether the object is a source in a relationship record (222). If the object is not a source in a relationship record, then logic determines whether the object is a target in a relationship record (223). If at step 223, the object is not a target, then it is interpreted according to other rules. If the object is a target in a relationship record at step 223, then the gesture is tracked according to the relationship record. The logic monitors the input gesture to detect the end of the gesture (224). If the gesture has not ended, then the logic can send a "ve" event (225), and continue monitoring at step 224. Upon ending of the input gesture, then the logic updates the object for the target graphical object at step 226, indicating its modification, such as a new location or size. On rendering the screen space at the client-side node, the target object is moved or changed in size for example. Likewise, the source object of the relationship record is moved or changed in size so as to maintain the same coordinates relative to the area of the target object. No changes required however, for the source object record. Also, upon updating the target graphical object, the logic can send a "he" event to other network nodes for recording in the spatial event map at step 227.

If at step 222, is determined that the selected object is a source in a relationship record, then the flowchart proceeds to step 228 in FIG. 2C. At step 228, it is determined whether the input gesture has ended or if not, then the logic can send a "ve" events (229) and continue monitoring at step 228. At the end of the input gesture, logic determines whether the relationship identified by the relationship record of the selected source object is broken by the gesture (230). If not, then the relative coordinates of the source object can be updated, while the relationship record is maintained (231), and the logic can send an "he" record to record the gesture in the spatial event map.

If at step 230, it is determined that the relationship specified by the relationship record is broken (such as by dragging the source object outside the area of the target object in an attachment relationship), then the logic proceeds to step 232. At step 232, the logic determines whether a new relationship is formed (such as by terminating the input gesture over a different graphical object). If at step 232 it is determined that no new relationship is formed, then the relationship record can be updated by creating a null target value disconnecting the source from the target, and by changing the location of the target object to work space coordinates so that its location in the workspace can be determined directly by its coordinates, and independent of the relationship record (233). The logic can then send an "he" record to record the gesture in the spatial event map (235).

If at step 232 it is determined that a new relationship has been formed, then the logic can update the relationship record by changing the target object and potentially the "type" parameter, disconnecting the source from the original target and connecting it to the new target, and also changing the source coordinates to coordinates relative to the area of the new target/type (234). The logic can then send an "he" record to record the gesture in the spatial event map (235).

FIGS. 3A-3D illustrate a sequence of images on a screen space 261 corresponding to the gestures for creating an attached group of objects, and a corresponding relationship record. In FIG. 3A, the screen space 261 displays graphical targets of events from the event log, including objects 300, 301, 310 and 311 having respective positions in the screen space, and corresponding positions in the virtual workspace.

In FIG. 3A, the illustration shows a touch represented by the hand and dot in the area of the screen space allocated to object 311. The gesture of pressing the finger on object 311 is interpreted by the client driver, which generates a protocol event identifying a volatile event and indicating the start of the gesture on the position of the touched object 311 in the workspace. An example event record is shown in Table 1 with the application event "pressing finger on object 311." Note that the position is specified by the parameters "rect" and identify coordinates in the workspace, because the object 311 is not a source of a relationship record.

In FIG. 3B, the illustration shows movement of the touch position along the line on the screen space represented by the dashed line, along with movement of the object 311. The gesture of moving the touch position without having released object 311 is interpreted by the client driver, which generates protocol events identifying volatile events and indicating changes in position of the touched object 311 in the workspace. Examples of the protocol events are shown in Table 1 with the application event "dragging object 311 inside object 310."

In FIG. 3C, the illustration shows a final position of the movement of the touch position along the line on the screen space represented by the dashed line, along with movement of the object 311, where the termination occurs inside the area in virtual workspace coordinates allocated to object 310.

As seen in Table 1, the coordinates of the object 311 change horizontally in this example, with the "x" coordinate of its upper left corner changing from 12 to 4 in the sequence of "ve" messages, while the "y" coordinate remains constant, and the "x,y" coordinates of the lower right corner maintain the same relative offsets, and the area of the object is not changing.

In FIG. 3D, the illustration shows lifting of the finger from the touch screen, indicating termination of the drag input gesture. The termination of the drag input gesture is interpreted by the client driver, which generates a create attachment relationship event according to the protocol. An example of the attachment relationship event is shown in Table 1 with the application event "releasing finger from object 311."

The attachment relationship event is an event of the type "he", including an identifier of the workspace to which it is linked; the specification of the action "create" indicated by the event; an event type parameter indicating "relationship"; a source identifier, which in this case is the object ID for the object 311; a target identifier, which in this case is the object ID for object 310; and a relative position parameter "rect" which specifies the corners of object 311 relative to the area of object 310. For example, an upper left corner of the parent object 310 can be designated coordinate (0,0) in the relative coordinate system used to define the location of child object 311. In contrast, the coordinate (0,0) in the virtual workspace, used to define the location of objects within the virtual workspace is not connected to any particular object, but may be arbitrarily assigned according to any particular instance of the coordinate system chosen. In the example shown in Table 1, the coordinate of the object 311 is no longer the workspace coordinate of (4,4,8,6) and becomes the relative coordinate (2,2,6,4) in the relationship record.

This position parameter is now a relative position within the area of object 310. Object 311 is now a child of parent object 310 for the purposes of positioning in the screen space and in the virtual workspace. Therefore, the position of the object 311 on a screen space, and in the workspace is now determined relative to the position of object 310.

The event data also includes in this example, an "order" parameter which indicates the order of the layering of the graphical objects on the screen. Typically, a child object is placed in a higher layer, which overlies a parent object in an attached group.

TABLE 1

Attaching a child to a parent

| Application Events | Outbound Protocol Events |
| --- | --- |
| Pressing finger on object 311 | ["ve", "object311", "position", {"rect": [12, 4, 16, 6], "order": 5}] |
| Dragging object 311 inside object 310 | ["ve", " object311", "position", {"rect": [11, 4, 15, 6], "order": 5}] |
| | ["ve", " object311", "position", {"rect": [10, 4, 14, 6], "order": 5}] |
| | . . . |
| | ["ve", " object311", "position", {"rect": [4, 4, 8, 6], "order": 5}] |
| Releasing finger from object 311 | ["he", "<workspace_id>", "create", { "type":"relationship", "id":" object311.attachment", "relation":"attachment", "source": " object311", "target": " object310", "rect": [2, 2, 6, 4], "order": 1} ] |

The protocol events in Table 1, and those in the tables set out below, are transmitted as API-compliant messages to the server-side network node that maintains the persistent database specifying the content of the workspace. Also, the protocol events are transmitted as API compliant messages, either directly from the client-side node at which they are generated or from the server-side node, to other client-side nodes having drivers simultaneously accessing the same workspace.

FIGS. 4A-4C illustrate a sequence of images on a screen space 261 corresponding to the gestures for moving and attached group of objects with a child object 311 attached to a parent object 310. Objects 300 and 301 are also illustrated in the screen space 261 and provide perspective showing movement of the attached group.

In FIG. 4A, the illustration shows a touch represented by the hand and dot in the area of the screen space allocated to the parent object 310. The gesture of pressing finger on the area of the parent object 310 that is not overlain by the child object 311, is interpreted by the client driver, which generates according to the protocol, a volatile event indicating the position of object 310 in workspace. An example event record is shown in Table 2, with the application event "pressing finger on object 310." The position in the event record specified by the parameters "rect" identify the coordinates in the workspace of the parent object 310.

In FIG. 4B, the illustration shows dragging of the touch position along the line on the screen represented by the dashed line, along with movement of the attached group with parent object 310. The gesture of moving the touch position without releasing the object 310 is interpreted by the driver, which generates a sequence of protocol events of the type "ve" indicating the updated positions. Examples of the protocol events are shown in Table 2 with the application event "dragging object 310." Again, the coordinates in the parameter "rect" define to the workspace location of the parent object 310.

In FIG. 4C, the illustration shows releasing of object 310 by removing the touch from the screen space 261. The gesture of releasing the object 310 is interpreted by the driver which generates a protocol event of the type "he" indicating the updated position of the parent object 310 on completion of the gesture. An example of the protocol event is shown in Table 2 with the application event "releasing finger from object 310." Again, the coordinates in the parameter "rect" define the workspace location of the parent object 310.

This sequence of protocol events shown in Table 2 in this example are the same as generated when moving a typical object within the workspace, which may or may not be an object in an attachment relationship (coordinates in Table do not track the figure). In the generation of the sequence of images shown in FIGS. 4A-4C, a client driver is responsible for updating the position of the child object 311, and any other child object of the object 310 being moved. The client driver in rendering its screen space identifies any objects having relationship records of attachment, and determines whether such objects are related as a source to the object being moved by the sequence of protocol events shown in Table 2. In the event that an attachment relationship event record is found that links to the object 310, then the client positions the identified child objects using the relative coordinates of the attachment relationship event record.

TABLE 2

Moving a parent with an attached child

| Application Events | Outbound Protocol Events |
|---|---|
| Pressing finger on object 310 | ["ve", " object310", "position", {"rect": [2, 2, 10, 8], "order": 1}] |
| Dragging object 310 | ["ve", " object310", "position", {"rect": [3, 1.7, 11, 7.7], "order": 1}] |
| | ["ve", " object310", "position", {"rect": [4, 1.5, 12, 7.5], "order": 1}] |
| | ["ve", " object310", "position", {"rect": [5, 1.2, 13, 7.2], "order": 1}] |
| | ["ve", " object310", "position", {"rect": [6, 1, 14, 7], "order": 1}] |
| Releasing finger from object 310 | ["he", " object310", "position", {"rect": [6, 1, 14, 7], "order": 1}] |

FIGS. 5A-5C illustrate a sequence of images on a screen space 261 corresponding to the gestures for moving a child object 311 within a parent object 310 of an attachment relationship. FIG. 5A illustrates the gesture of pressing a finger on an area of child object 311, which is interpreted by the client driver, which generates according to the protocol in response to the relationship record, a volatile event indicating the position of the child object 311 in coordinates (2,2,6,4) relative to the parent area. Note that this position could be maintained according to the relative position defined in the attachment relationship record. However, doing so would require an additional logical step in the rendering of the sequence of images and the generation of the event messages. An example of the event record shown in Table 3, with the application event "pressing finger on object 311." This gesture may be preceded by a "tap to focus" gesture on the touchscreen, in some embodiments. No event record or event message is generated in response to the "tap to focus" gesture.

FIG. 5B illustrates dragging of the touch position along the line on the screen represented by the dashed line, along with movement of object 311. The gesture of moving the touch position without releasing the object 311 is interpreted by the driver, which generates a sequence of protocol events of the type "ve" indicating the updated positions according to the coordinates of the workspace in this example. Examples of the protocol events are shown in Table 3 with the application event "dragging object 311." The coordinates in the table do not match those in the drawing. Again, the coordinates in the parameter "rect" define workspace location of the child object 311 in this example. As seen in the table, which assumes a parent object having an area defined by coordinates (0, 0, 8, 6), with a child starting with relative coordinates (2, 2, 6, 4). The workspace coordinates may be any value, such as for example (2, 2, 10, 8). In the example of the table, the upper left x, y coordinate changes from (2, 2) to (3, 1.7) to (4, 1.5) to (5, 1.2) to (6, 1) remaining inside the parent area, along with the touch position. In this example and the lower right x, y coordinate changes from (6, 4) to (7, 3.7) to (8, 3.5) to (9, 3.2) to (10, 3) outside the parent area.

FIG. 5C illustrates releasing of the object 311 by removing the touch from the screen space 261. The gesture of releasing the object 311 is interpreted by the driver, which generates a protocol events of the type "he" indicating the updated relative position of the child object 311 on completion of the gesture. An example of the protocol message is shown in Table 3 with the application event "releasing finger from object 311." Again, the coordinates in the parameter "rect" define the relative location of the child object 311 inside the parent area.

TABLE 3

Moving the child within the parent

| Application Events | Outbound Protocol Events |
|---|---|
| Tap-to-focus Object 311 | None |
| Pressing finger on Object 311 | ["ve", " object311", "position", {"rect": [2, 2, 6, 4], "order": 1}] |
| Dragging orange elem within blue elem | ["ve", " object311", "position", {"rect": [3, 1.7, 7, 3.7], "order": 1}] |
| | ["ve", " object311", "position", {"rect": [4, 1.5, 8, 3.5], "order": 1}] |
| | ["ve", " object311", "position", {"rect": [5, 1.2, 9, 3.2], "order": 1}] |
| | ["ve", " object311", "position", {"rect": [6, 1, 10, 3], "order": 1}] |
| Releasing finger from orange elem | ["he", " object311", "position", {"rect": [6, 1, 10, 3], "order": 1}] |

FIGS. 6A-6C illustrate a sequence of images on a screen space 261 corresponding to the gestures for moving a child object 311 out of the area of a parent object 310, thereby detaching child object 311 from the parent object 310 in the attachment relationship.

FIG. 6A illustrates the gesture of pressing a finger on an area of the child object 311, which is interpreted by the driver which generates according to the protocol, a volatile event indicating the position of the child object 311 in workspace. Again, this position could be maintained according to the relative position defined in the attachment relationship record in other embodiments. An example of the event record generated is shown in Table 4, with the application event "pressing finger on object 311." Again, this gesture may be preceded by a "tap to focus" gesture on the touchscreen, in some embodiments. No event record or event message is generated in response to the "tap to focus" gesture in this example.

FIG. 6B illustrates dragging of the touch position along the line of the screen represented by the dashed line, along with movement of the object 311. The gesture of moving the touch position without releasing object 311 is interpreted by the driver, which generates a sequence of protocol events of the type "ve" indicating the updated positions according to the relative coordinates. Examples of the protocol events are shown in Table 4 with the application event "dragging object 311." Again, the coordinates in the parameter "rect" define the workspace location of the child object 311 using relative coordinates relative to the area of the parent or target object.

FIG. 6C illustrates the image produced upon releasing the object 311 by removing the touch from the screen space 261. The gesture of releasing object 311 is interpreted by the driver as a termination of the object, which generates a history event protocol message to update the attachment relationship record associated with the object 311. In this example, the history event upon termination of the gesture is an attachment relationship update event, rather than the position event of the child object 311 itself. An example of the protocol message is shown in Table 4 with the application event "releasing finger from object 311." The coordinates of the parameter "rect" in this event define the workspace location of the child object 311.

Upon determination that the gesture terminated with a touch position outside the area assigned to the object 310, the child driver produces an update relationship event which results in changing the target object in the attachment relationship to object to a null value such as a workspace ID, indicating that the object 311 is no longer in an attachment relationship. In response to this event, the attachment relationship record for object 311 is updated by changing the "target" parameter to the workspace, and setting the "rect" parameter to coordinates in the workspace. In this example, there is no protocol event used to create a new record of the type "he" for the action to position the object 311. Rather, the relationship record having the object ID "object311.attachment" is used to record the event, and the source object location is updated to workspace coordinates without further messaging.

TABLE 4

Detaching the child from the parent by dragging

| Application Events | Outbound Protocol Events |
| --- | --- |
| Tap-to-focus orange elem | None |
| Pressing finger on object 311 | ["ve", " object311", "position", {"rect": [2, 2, 6, 4], "order": 1}] |
| Dragging object 311 outside object 310 | ["ve", " object311", "position", {"rect": [3, 1.8, 7, 3.8], "order": 1}] |
|  | ["ve", " object311", "position", {"rect": [4, 1.6, 8, 3.6], "order": 1}] |
|  | . . . |
|  | ["ve", " object311", "position", {"rect": [9, 1, 13, 3], "order": 1}] |

TABLE 4-continued

Detaching the child from the parent by dragging

| Application Events | Outbound Protocol Events |
| --- | --- |
| Releasing finger from object 311 | ["he", " object311.attachment", "update", { "source": " object311", "target": "<workspace_id>", "rect": [11, 3, 15, 5], "order": 6} ] |

In this example, the logic to implement detaching of the child object 311 from the parent object 310 is activated when the touch position of the finger lies outside the area assigned to the parent object 310. In alternative, the logic to implement detaching of the child object 311 from the parent object 310 is activated when the area of the child object 311 when updated according to the touch position at the termination of the gesture no longer overlaps with the area of the parent object 310. Other geometric relationships could be utilized as well.

FIGS. 7A-7C illustrate a sequence of images on a screen space 261 corresponding to the gestures for moving a child object 311 out of the area of a parent object 310 according to an attachment relationship, and into the area of a new parent object 320, thereby disconnecting the child object 311 from the parent object 310 and connecting the child object 311 to another parent 320.

FIG. 7A illustrates the gesture of pressing a finger on an area of a child object 311, which is in an attachment relationship with parent object 310. This gesture is interpreted by the driver which generates according to the protocol, a volatile event of the type "ve" indicating the position of the child object 311 according to the relative position defined in the attachment relationship record. An example of the event record generated is shown in Table 5, with the application event "pressing finger on object 311." This gesture may be preceded by a "tap to focus" gesture on the touch screen, in some embodiments. No event record or event message is generated in response to the "tap to focus" gesture in this example in this example.

FIG. 7B illustrates dragging of the touch position along the line of the screen represented by the dashed line, along with movement of object 311. The gesture of moving the touch position without releasing object 311 is interpreted by the driver, which generates a sequence of protocol events of the type "ve" indicating the updated positions of object 311 according to the relative coordinates in this example. The endpoint of the gesture in this example falls in the area of object 320 in this example, in contrast to that of FIGS. 6A-6C in which the endpoint of the gesture falls in the workspace region not covered by an object. Examples of the protocol events in the example of FIG. 7B are shown in Table 5, with the application event "dragging object 311 inside object 320." The parameter "rect" in the protocol events in Table 5 define the position of the object 311 using the coordinates in the workspace.

FIG. 7C illustrates the image produced upon releasing the object 311 over the object 320, by removing the touch from the screen space 261. The gesture of releasing object 311 is interpreted by the driver as a termination of the gesture, which generates a history event protocol message to update the attachment relationship record associated with the object 311. In this example, the history event upon termination of the gesture is an attachment relationship update event. An example of the protocol message is shown in Table 5 with the application event "releasing finger from object 311."

TABLE 5

Reattaching the child to another parent by dragging

| Application Events | Outbound Protocol Events |
|---|---|
| Tap-to-focus object 311 | None |
| Pressing finger on object 311 | ["ve", "577cda05361ccd3d00004333", "position", {"rect": [2, 2, 6, 4], "order": 1}] |
| Dragging object 311 inside object 320 | ["ve", " object311", "position", {"rect": [3, 1.8, 7, 3.8], "order": 1}] |
| | ["ve", " object311", "position", {"rect": [4, 1.6, 8, 3.6], "order": 1}] |
| | . . . |
| | ["ve", " object311", "position", {"rect": [9, 1, 13, 3], "order": 1}] |
| Releasing finger from object 311 | ["he", " object311.attachment", "update", { "source": " object311", "target": "object 320", "rect": [-1, 1, 3, 3], "order": 1} ] |

Upon determination that the gesture terminated with a touch position inside the area assigned to the object 320, the child driver produces an update relationship event which results in changing the target object in the attachment relationship to object to the object identifier for object 320, such as "object320", indicating that the object 311 is in an attachment relationship with object 320. In response to this event, the attachment relationship record for object 311 is updated by changing the "target" parameter to the workspace to "object 320", and setting the "rect" parameter to relative coordinates in the within the area of object 320 (which as can be seen are negative in this example as the upper left corner of object 311 is located to the left of the upper left corner of the object 320. In this example, there is no protocol event used to create a new record of the type "he" for the action to position the object 311. Rather, the relationship record having the object ID "object311.attachment" is relied upon.

FIGS. 8A-8C illustrate a sequence of images on a screen space 261 corresponding to the gestures for resizing a parent object 323 having a child object 324 attached by an attachment relationship. As a result of the gesture, the zoom level of the parent object 323 and of the child object 324 are adjusted according to the resizing gesture. Also, the relative position of the child object 324 within the parent object 323 is maintained.

FIG. 8A illustrates the gesture of pressing two fingers on the parent object 323 in preparation for a pinch to induce the resizing. This gesture is interpreted by the driver which generates according to the protocol, a volatile event of the type "ve" indicating the position of the parent object 323. An example of the event record generated is shown in Table 6, with the application event "pressing fingers on object 323."

FIG. 8B illustrates the pinching gesture represented by the arrow symbols associated with the hand along with the resizing of the parent object 323 from the original area represented by the dashed line, to the final area represented by the solid line. The gesture of pinching on the parent object 323 without releasing the parent object 323 is interpreted by the driver, which generates a sequence of protocol messages of the type "VE" indicating the position of the parent object 323, with updated size parameter "rect" specifying the changes in area of the parent object 323 in workspace. Examples of the protocol events in the example of FIG. 8B are shown in Table 6, with the application event "pinching object 323."

FIG. 8C illustrates the image produced upon releasing the parent object 323, by removing the touch from the screen space 261. The gesture of releasing parent object 323 is interpreted by the driver is termination of the gesture, and generates a history event of the type "he" indicating the position of the parent object 323, with the updated size parameter "rect." This example, there is no event record created associated with the child object 324. Rather, the relative coordinates of the child object can remain unchanged. As the client produces the sequences of images of that FIGS. 8A-8C, changes in the position and size of the parent object 323 are converted to changes in position and size of the child object 324, according to the relative coordinates of the child object 324 within the parent object 323. An example of the protocol event is shown in Table 6, with the application event "releasing finger from object 323."

TABLE 6

Resizing a parent with an attached child

| Application Events | Outbound Protocol Events |
|---|---|
| Pressing fingers on object 323 | ["ve", " object323", "position", {"rect": [2, 2, 10, 8], "order": 1}] |
| Pinching object 323 | ["ve", " object323", "position", {"rect": [2, 2, 8.6, 7], "order": 1}] |
| | ["ve", " object323", "position", {"rect": [2, 2, 7.3, 6], "order": 1}] |
| | ["ve", " object323", "position", {"rect": [2, 2, 6, 5], "order": 1}] |
| Releasing fingers from object 323 | ["he", " object323", "position", {"rect": [2, 2, 6, 5], "order": 1}] |

Other gestures can be used to perform other actions related to objects that are subject of an attachment relationship. One example of a sequence for deleting a child object is shown in Table 7. For example, the procedure can involve a "tap to focus" gesture selecting the child object. No protocol event is generated in response to the "tap to focus" gesture. Then, the procedure can involve using a menu on the graphical user interface to select a delete function. Upon selecting the delete function in the menu, the driver generates an event message identifying the child object and indicating that it is deleted. This example, the event of the type "he" that establishes deletion of the child object can be utilized alone, without a corresponding event to update the attachment relationship record that attaches the child to the parent. When the driver encounters an attachment relationship record associated with a particular parent target that is subject of a gesture, the deletion event overrides the relationship record. In other embodiments, both the deletion event and an update relationship event could be generated.

TABLE 7

Deleting a child attached to a parent

| Application Events | Outbound Protocol Events |
|---|---|
| Tap-to-focus Object 311 | None |
| Deleting object 311_via menu | ["he", " object311", "delete", {"hidden": true}] |

In another example, a parent object can be deleted with one or more child object attached. The procedure can involve a "tap to focus" gesture selecting the parent object. Then the procedure can involve using a menu on the graphical user interface to select the delete function. Upon selecting the delete function in the menu a delete function. An example of a protocol message generated is shown in Table 8. Upon deletion of a parent object associated with a child object by an attachment relationship record, the driver finds the attachment relationship, and on rendering the images omits the child object.

In an alternative embodiment, the deletion of the parent object can result in an update of the attachment relationship record to change the target to a null value, such as the workspace ID, and the location parameter is updated with its coordinates in the workspace. In this alternative, the child object remain can visible in the rendered viewport of the workspace.

TABLE 8

Deleting a parent with one or more children attached

| Application Events | Outbound Protocol Events |
|---|---|
| Deleting object 310 menu | ["he", " object310", "delete", {"hidden": true}] |

The interactions described with reference to Tables 1 to 8, demonstrate logic for a node in a collaboration system, in which input gestures that identify the target object, and move or resize the target object, result in a corresponding movement or resizing of the source object; input gestures that identify the source object, and move the source object, result in repositioning the source object relative to the target object, or disconnecting the source object from the target object; and input gestures that identify a first object result and move the first object over a second object result in establishing a relationship record with the first object as a source object to the second object as a target object.

The examples described with reference to Tables 1 to 8 involve an attachment relationship. In another type of relationship, the characteristics specified in the relationship record comprise a link between the source graphical object in the relationship record to the target graphical object to be rendered in the screen space having graphical features identified in the relationship record. Feature specified can include the type of graphical link to be rendered, such as whether it is curved or straight, the color of the graphical link, directionality of the link and so on.

In some embodiments, relationship records can have a plurality of target graphical objects, a plurality of source graphical targets or both. In some relationship types, the number of source graphical objects may be restricted to one, the number of target graphical targets may be restricted to one, or both.

Figure 9:
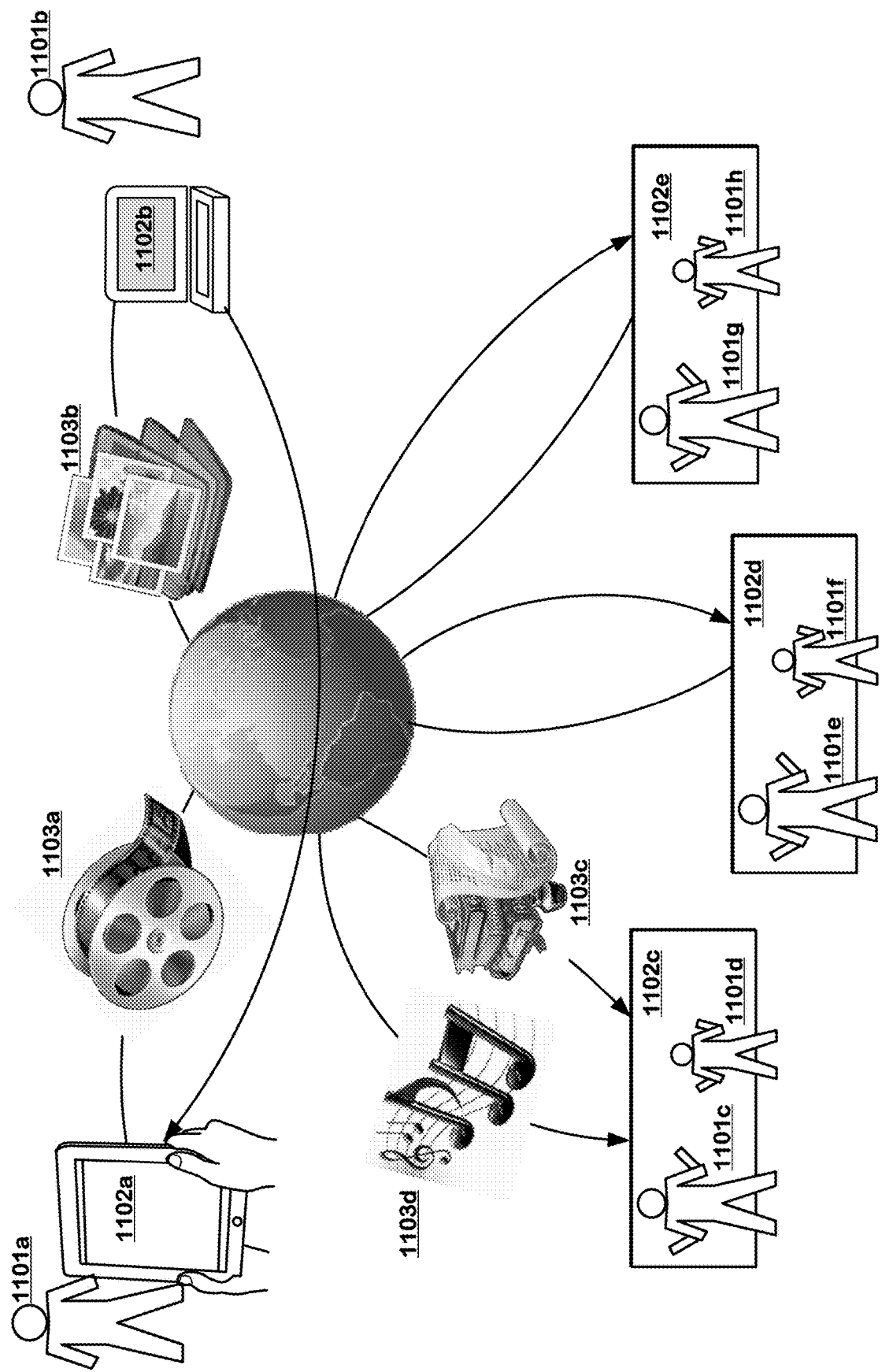
FIG. 9 illustrates example aspects of a digital display collaboration environment.

FIG. 9 illustrates example aspects of a digital display collaboration environment. In the example, a plurality of users 1101a-h (collectively 1101), may desire to collaborate with each other in the creation of complex images, music, video, documents, and/or other media, all generally designated in FIG. 11 as 1103a-d (collectively 1103). The users in the illustrated example use a variety of devices configured as electronic network nodes, in order to collaborate with each other, for example a tablet 1102a, a personal computer (PC) 1102b, and many large format displays 1102c, 1102d, 1102e (collectively devices 1102). In the illustrated example, the large format display 1102c, which is sometimes referred to herein as a "wall", accommodates more than one of the users, (e.g. users 1101c and 1101d, users 1101e and 1101f, and users 1101g and 1101h). The user devices, which are referred to as client-side network nodes, have displays on which a screen space is rendered, where the screen space is a displayable area allocated for displaying events in a workspace. The displayable area for a given user may comprise the entire screen of the display, a subset of the screen, a window to be displayed on the screen and so on, such that each has a limited area or extent compared to the virtually unlimited extent of the workspace.

Figure 10:
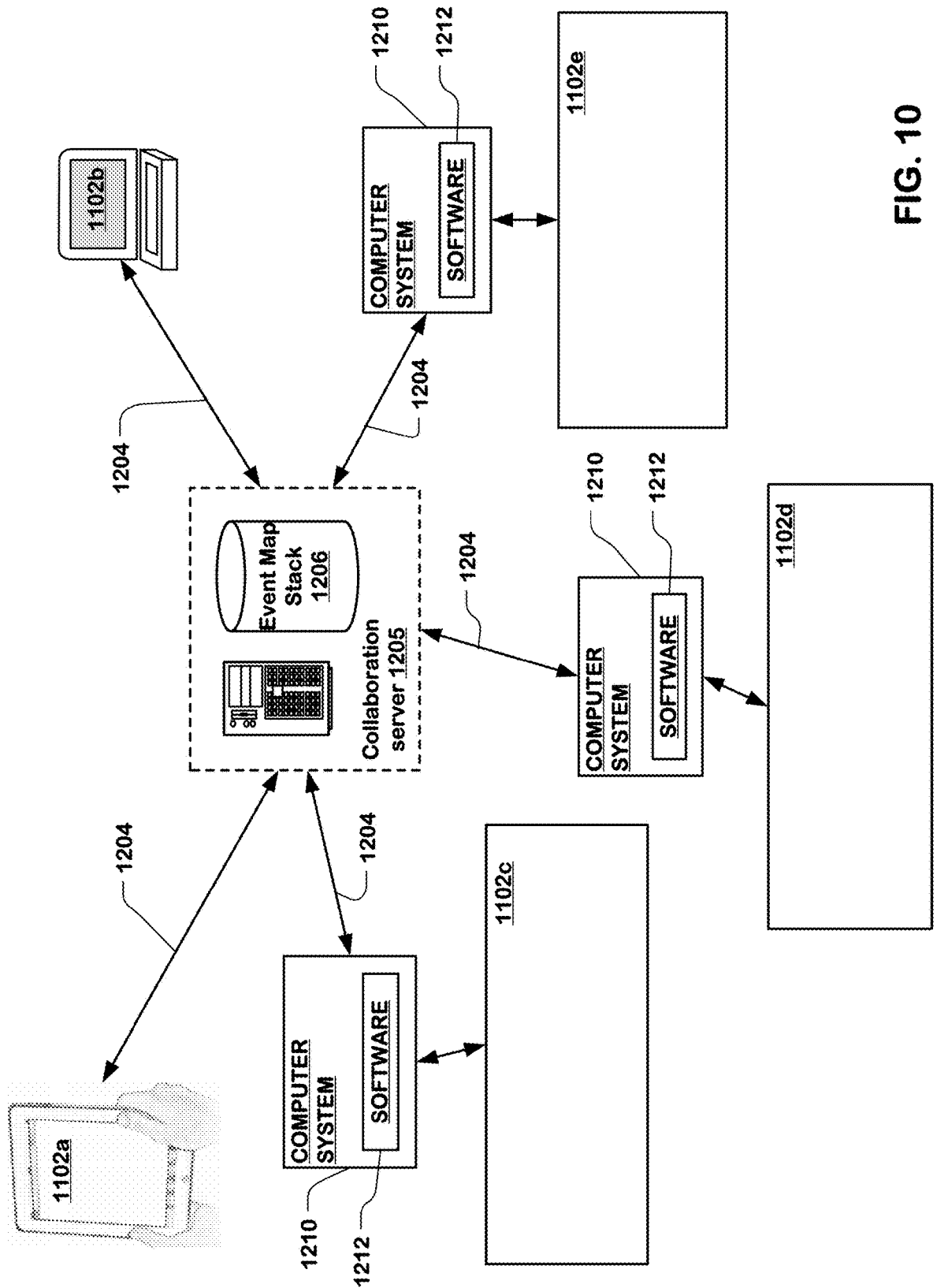
FIG. 10 illustrates additional example aspects of a digital display collaboration environment.

FIG. 10 illustrates additional example aspects of a digital display collaboration environment. As shown in FIG. 10, the large format displays 1102c, 1102d, 1102e sometimes referred to herein as "walls," are controlled by respective client-side network nodes (e.g. system 1210) on a physical communication network 1204, which in turn are in network communication with a central collaboration server 1205 configured as a server-side physical network node or nodes, which has accessible thereto a database 1206 storing spatial event map stacks for a plurality of workspaces. As used herein, a network node is an addressable device or function in an active electronic device that is attached to a network, and is capable of sending, receiving, or forwarding information over a communications channel. Examples of electronic devices which can be deployed as network nodes include all varieties of computers, workstations, laptop computers, hand-held computers and smart phones. As used herein, the term "database" does not necessarily imply any unity of structure. For example, two or more separate databases, when considered together, still constitute a "database" as that term is used herein.

The application running at the collaboration server 1205 can be hosted using Web server software such as Apache or nginx, or a runtime environment such as node.js. It can be hosted for example on virtual machines running operating systems such as LINUX. The server 1205 is heuristically illustrated in FIG. 10 as a single computer. However, the server architecture can involve systems of many computers, each running server applications, as is typical for large-scale cloud-based services. The server architecture includes a communication module which can be configured for various types of communication channels, including more than one channel for each client in a collaboration session. For example, with near-real-time updates across the network, client software can communicate with the server communication module using a message-based channel, based for example on the WebSocket protocol. For file uploads as well as receiving initial large volume workspace data, the client software can communicate with the server communication module via HTTPS. The server can run a front-end program written for example in JavaScript served by Ruby-on-Rails, support authentication/authorization based for example on Oauth, and support coordination among multiple distributed clients. The server communication module can include a message based communication protocol stack, such as a Web Socket application, that performs the functions of recording user actions in workspace data, and relaying user actions to other clients as applicable. This system can run on the node.JS platform for example, or on other server technologies designed to handle high-load socket applications.

The database 1206 stores, for example, a digital representation of workspace data sets for a spatial event map comprising the "he" records of each session where the workspace data set can include or identify events related to objects displayable on a display canvas. A workspace data set can be implemented in the form of a spatial event stack, managed so that at least persistent spatial events are added to the stack (push) and removed from the stack (pop) in a first-in-last-out pattern during an undo operation. There can be workspace data sets for many different workspaces. A data set for a given workspace can be configured in a database, or as a machine readable document linked to the workspace. The workspace can have unlimited or virtually unlimited dimensions. The workspace data includes event data structures identifying objects displayable by a display client in the display area on a display wall, and associating a time and a location in the workspace with the objects identified by the event data structures. Each device 1102 displays only a portion of the overall workspace. A display wall has a display area for displaying objects, the display area being mapped to a corresponding area in the workspace that corresponds to a region in the workspace centered on, or otherwise located with, a user location in the workspace. The mapping of the display area to a corresponding area in the workspace is usable by the display client to identify objects in the workspace data within the display area to be rendered on the display, and to identify objects to which to link user touch inputs at positions in the display area on the display.

The server 1205 and database 1206 can constitute a server-side network node, including memory storing a log of events relating to graphical targets having locations in a workspace, entries in the log include an action type, an flag indicating whether the event qualifies as a history event "he" or a volatile event "ve", a location in the workspace of the graphical target of the event, a time of the event, and a target identifier of the graphical target of the event. The server can include logic to establish links to a plurality of active client-side network nodes, to receive messages identifying events relating to modification and creation of graphical targets having locations in the workspace and to modification and creation of relationship records, to add events to the log in response to said messages, and to distribute messages relating to events identified in messages received from a particular client-side network node to other active client-side network nodes.

The logic in the server 1205 can comprise an application program interface, including a specified set of procedures and parameters, by which to send messages carrying portions of the log to client-side network nodes, and to receive messages from client-side network nodes carrying data identifying "ve" and "he" events relating to graphical targets having locations in the workspace.

Also, the logic in the server 1205 can include an application interface including a process to distribute events received from one client-side network node to other client-side network nodes.

The events compliant with the API can include a first class of event (history event) to be stored in the log and distributed to other client-side network nodes, and a second class of event (volatile event, which is an ephemeral record not to be kept in the persistent database, or not to be utilized in rendering a screen space upon first displaying a viewport of the workspace) to be distributed to one or more other client-side network nodes.

The server 1205 can store workspace data sets for a plurality of workspaces, and provide the workspace data to the display clients participating in the session. The workspace data is then used by the computer systems 1210 with appropriate software 1212 including display client driver software, to determine images to display on the display, and to assign objects for interaction to locations on the display surface. The server 1205 can store and maintain a multitude of workspaces for different collaboration sessions. Each workspace can be associated with a group of users and configured for access only by authorized users in the group.

In some alternatives, the server 1205 can keep track of a "viewport" for each device 1102, indicating the portion of the canvas viewable on that device, and can provide to each device 1102 access to the data needed to render the viewport.

A computer program product embodying the logic or parts of the logic described herein can be stored in non-transitory computer readable memory in the server-side network node. The computer program product can be delivered via communication channels by a server to a client-side network node for use in a collaboration session, and stored in non-transitory computer readable memory in the client-side network node.

Application software running on the client device responsible for rendering drawing objects, handling user inputs, and communicating with the server can be based on HTML5 or other markup based procedures, and run in a browser environment. This allows for easy support of many different client operating system environments.

The user interface data stored in database 1206 includes various types of objects including graphical constructs, such as image bitmaps, video objects, multi-page documents, scalable vector graphics, and the like. The devices 1102 are each in communication with the collaboration server 1205 via a network 1204. The communication network 1204 can include all forms of networking components, such as LANs, WANs, routers, switches, WiFi components, cellular components, wired and optical components, and the internet. In one scenario two or more of the users 1101 are located in the same room, and their devices 1102 communicate via WiFi with the collaboration server 1205. In another scenario two or more of the users 1101 are separated from each other by thousands of miles and their devices 1102 communicate with the collaboration server 1205 via the internet. The large format displays 1102*c*, 1102*d*, 1102*e* can be multi-touch devices which not only display images, but also can sense user gestures provided by touching the display surfaces with either a stylus or a part of the body such as one or more fingers. In some embodiments, a large format display (e.g. 1102*c*) can include sensors and logic that can distinguish between a touch by one or more fingers (or an entire hand, for example), and a touch by a stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 1102*c* may, for example, be an array of Model No. MT553UTBL MultiTaction Cells, manufactured by MultiTouch Ltd, Helsinki, Finland, tiled both vertically and horizontally. In order to provide a variety of expressive means, the wall 1102*c* is operated in such a way that it maintains "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, a display array can have a displayable area totaling on the order of 6 feet in height and 30 feet in width, which is wide enough for multiple users to stand at different parts of the wall and manipulate it simultaneously.

FIG. 11A represents a data structure which can be part of workspace data maintained by a database at the collaboration server 1205. In FIG. 11A, an event data structure is illustrated for events such as Volatile Events or Historic Events. An event is an interaction with the workspace data that can result in a change in workspace data. Thus, an event can include an event identifier, a timestamp, a session identifier, an event type parameter, the client identifier as client-id, and an array of locations in the workspace, which can include one or more for the corresponding event. It is desirable, for example, that the timestamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include style events, which indicate the display parameters of a stroke, for example. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths for example.

Events can be classified as persistent history events and as ephemeral, volatile events. Processing of the events for addition to workspace data, and sharing among users can be dependent on the classification of the event. This classification can be inherent in the event type parameter, or an additional flag or field can be used in the event data structure to indicate the classification.

A spatial event map can include a log of events having entries for history events, where each entry comprises a structure such as illustrated in FIG. 11A. A server-side network node includes logic to receive messages carrying volatile and history events from client-side network nodes, and to send the volatile events to other client-side network nodes without forwarding them to a server at which events are added as corresponding entries in the log, and to send history events to the other client-side network nodes while forwarding them to a server at which events are added as corresponding entries to the log.

FIG. 11B illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 11C illustrates a data structure which consolidates a number of events and objects into a cacheable set called a chunk. The data structure includes a session ID, an identifier of the events included in the chunk, and a timestamp at which the chunk was created.

FIG. 11D illustrates the data structure for links to a user participating in a session in a chosen workspace. This data structure can include an access token, the client identifier for the session display client, the user identifier linked to the display client, a parameter indicating the last time that a user accessed a session, and expiration time and a cookie for carrying various information about the session. This information can, for example, maintain a current location within the workspace for a user, which can be used each time that a user logs in to determine the workspace data to display at a display client to which the login is associated.

The system can encrypt communications with client-side network nodes, and can encrypt the database in which the spatial event maps are stored. Also, on the client-side network nodes, cached copies of the spatial event map are encrypted in some embodiments, to prevent unauthorized access to the data by intruders who gain access to the client-side computers.

Figure 12:
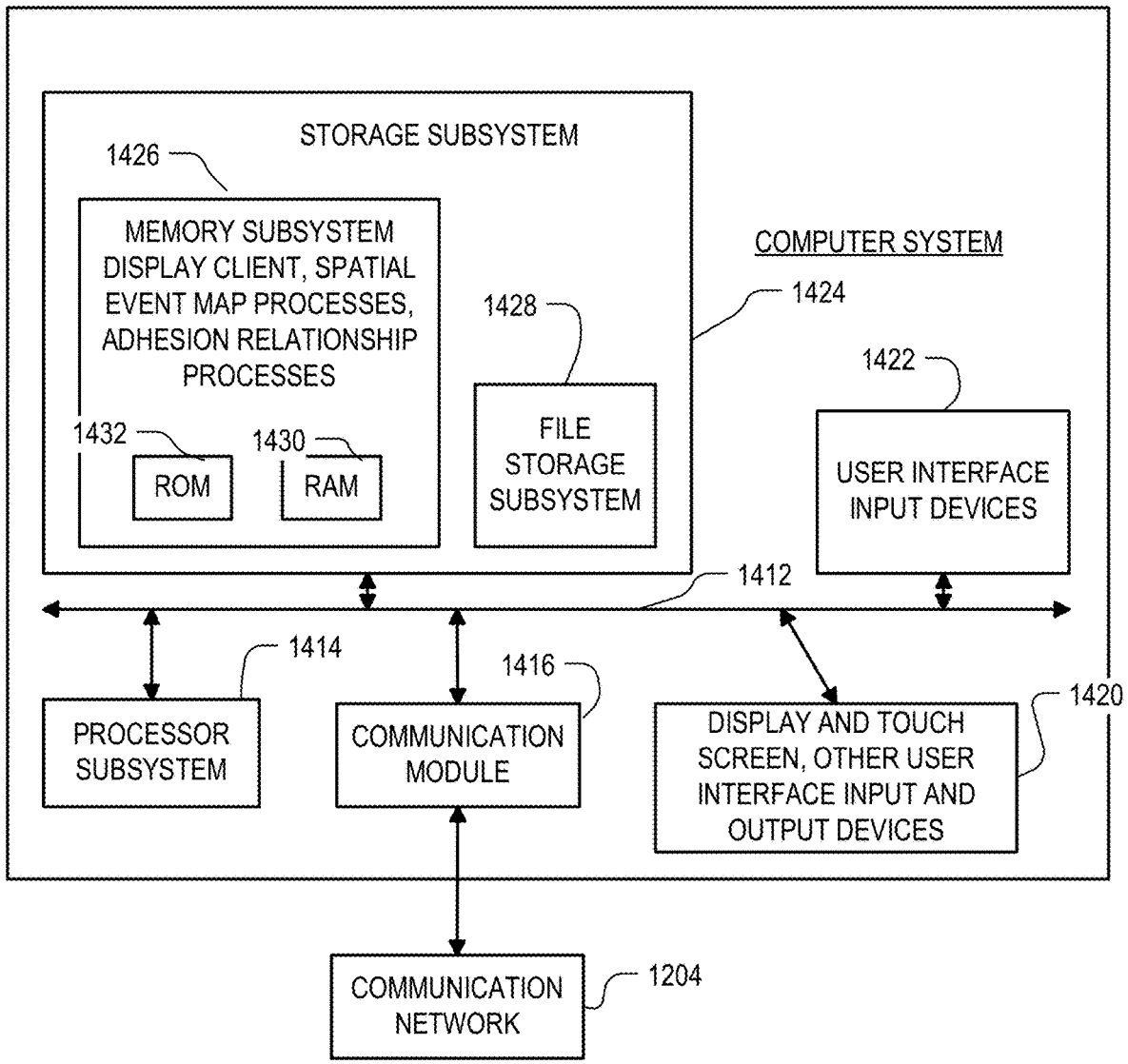
FIG. 12 is a simplified block diagram of the computer system 1210, e.g. a client-side node computer system.

FIG. 12 is a simplified block diagram of a computer system, or network node, which can be used to implement the client-side functions (e.g. computer system 1210) or the server-side functions (e.g. server 1205) in a distributed collaboration system. A computer system typically includes a processor subsystem 1414 which communicates with a number of peripheral devices via bus subsystem 1412. These peripheral devices may include a storage subsystem 1424, comprising a memory subsystem 1426 and a file storage subsystem 1428, user interface input devices 1422, user interface output devices 1420, and a network interface subsystem within a communication module 1416. The input and output devices allow user interaction with the computer system.

Communication module 1416 provides physical and communication protocol support for interfaces to outside networks, including an interface to communication network 1204, and is coupled via communication network 1204 to corresponding communication modules in other computer systems. Communication network 1204 may comprise many interconnected computer systems and communication links. These communication links may be wireline links, optical links, wireless links, or any other mechanisms for communication of information, but typically it is an IP-based communication network, at least at its extremities. While in one embodiment, communication network 1204 is the Internet, in other embodiments, communication network 1204 may be any suitable computer network.

The physical hardware components of network interfaces are sometimes referred to as network interface cards (NICs), although they need not be in the form of cards: for instance, they could be in the form of integrated circuits (ICs) and connectors fitted directly onto a motherboard, or in the form of macrocells fabricated on a single integrated circuit chip with other components of the computer system.

User interface input devices 1422 may include a keyboard, pointing devices such as a mouse, trackball, touchpad, or graphics tablet, a scanner, a touch screen incorporated into the display (including the touch-sensitive portions of large format display 1102*c*), audio input devices such as voice recognition systems, microphones, and other types of tangible input devices. In general, use of the term "input device" is intended to include all possible types of devices and ways to input information into the computer system or onto communication network 1204.

User interface output devices 1420 include a display subsystem that comprises a screen and a touch screen overlaying the screen, or other input device for identifying locations on the screen, a printer, a fax machine, or non-visual displays such as audio output devices. The display subsystem can include a cathode ray tube (CRT), a flat panel device such as a liquid crystal display (LCD), a projection device, or some other mechanism for creating a visible image. In the embodiment of FIG. 12, it includes the display functions of large format display 1102*c*. The display subsystem may also provide non-visual display such as via audio output devices. In general, use of the term "output device" is intended to include all possible types of devices and ways to output information from the computer system to the user or to another machine or computer system.

Storage subsystem 1424 stores the basic programming and data constructs that provide the functionality of certain embodiments of the technology disclosed.

The storage subsystem 1424 when used for implementation of server-side network nodes, comprises a product including a non-transitory memory based on computer readable medium storing a machine readable data structure including a spatial event map which locates events in a workspace, wherein the spatial event map includes a log of events, entries in the log having a location of a graphical target of the event in the workspace and a time. Also, the storage subsystem 1424 comprises a product including executable instructions for performing the procedures described herein associated with the server-side network node.

The storage subsystem 1424 when used for implementation of client-side network nodes, comprises a product including a non-transitory memory based on computer readable medium storing a machine readable data structure including a spatial event map in the form of a cached copy as explained below, which locates events in a workspace, wherein the spatial event map includes a log of events. Also, the storage subsystem 1424 comprises a product including executable instructions for performing the procedures described herein associated with the client-side network node, including interpretation of input gestures, manipulation of graphical objects and relationship records, and execution of procedures including those described with reference to FIGS. 2A-2C, 3A-3D, 4A-4C, 5A-5C, 6A-6C, 7A-7C, 8A-8C, 13 and 14.

For example, the various modules implementing the functionality of certain embodiments of the technology disclosed may be stored in storage subsystem 1424. These software modules are generally executed by processor subsystem 1414.

Memory subsystem 1426 typically includes a number of non-transitory memories including a main random access memory (RAM) 1430 for storage of instructions and data during program execution and a read only memory (ROM) 1432 in which fixed instructions are stored. File storage subsystem 1428 provides persistent storage for program and data files in non-transitory memory which may include non-volatile memory such a flash memory, a hard disk drive, a floppy disk drive along with associated removable media, a CD ROM drive, an optical drive, or removable media cartridges. The databases and modules implementing the functionality of certain embodiments of the technology disclosed may have been provided on a computer non-transitory memory based on readable medium such as one or more CD-ROMs, or delivered via a communication port by transitory signals, and may be stored by file storage subsystem 1428. The host memory subsystem 1426 contains, among other things, computer instructions which, when executed by the processor subsystem 1414, cause the computer system to operate or perform functions as described herein. As used herein, processes and software that are said to run in or on "the host" or "the computer," execute on the processor subsystem 1414 in response to computer instructions and data in the host memory subsystem 1426 including any other local or remote storage for such instructions and data.

Bus subsystem 1412 provides a mechanism for letting the various components and subsystems of a computer system communicate with each other as intended. Although bus subsystem 1412 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format display 1102c. Due to the ever-changing nature of computers and networks, the description of computer system 1210 depicted in FIG. 12 is intended only as a specific example for purposes of illustrating the preferred embodiments of the technology disclosed. Many other configurations of the computer system are possible having more or less components than the computer system depicted in FIG. 12. The same components and variations can also make up each of the other devices 1102 in the collaboration environment of FIG. 10, as well as the collaboration server 1205 and display database 1206.

In one type of embodiment, one or more of the client connection layer, message passing layer and collaboration layer can be implemented as virtual machines including network nodes in a physical machine hosted by a third party, and configured by computer programs to provide the services described herein.

The Application Program Interface used for messaging of events can be used by code developed for group management. The Memory Subsystem can store computer programs executable by the processor subsystem 1414 implementing client-side process for attachment relationship management as discussed above in connection with tables 1-8 for example. Also other processes, including other types of group selection, creation, movement, modification and deletion as described above. Also, computer programs for client-side processes executable by the processor subsystem 1414 for interpreting touch events and other user inputs supporting group processes can be included in the Memory Subsystem. Also, computer programs executable by the processor subsystem 1414 can implement the client-side functions and parameters for the spatial event map API as described herein.

For group management, the related code stored in the Memory Subsystem can include a file that acts as a repository of all groups existing in a workspace as determined using the spatial event map and current events in the local node, both potential groups during a selection or modification process, and final groups. It also implements the parser for group events received from a database that stores the history of events in the workspace, and handles sending events to the database whenever a group action has been performed locally such as adding members to a group, or moving the group.

Figure 13:
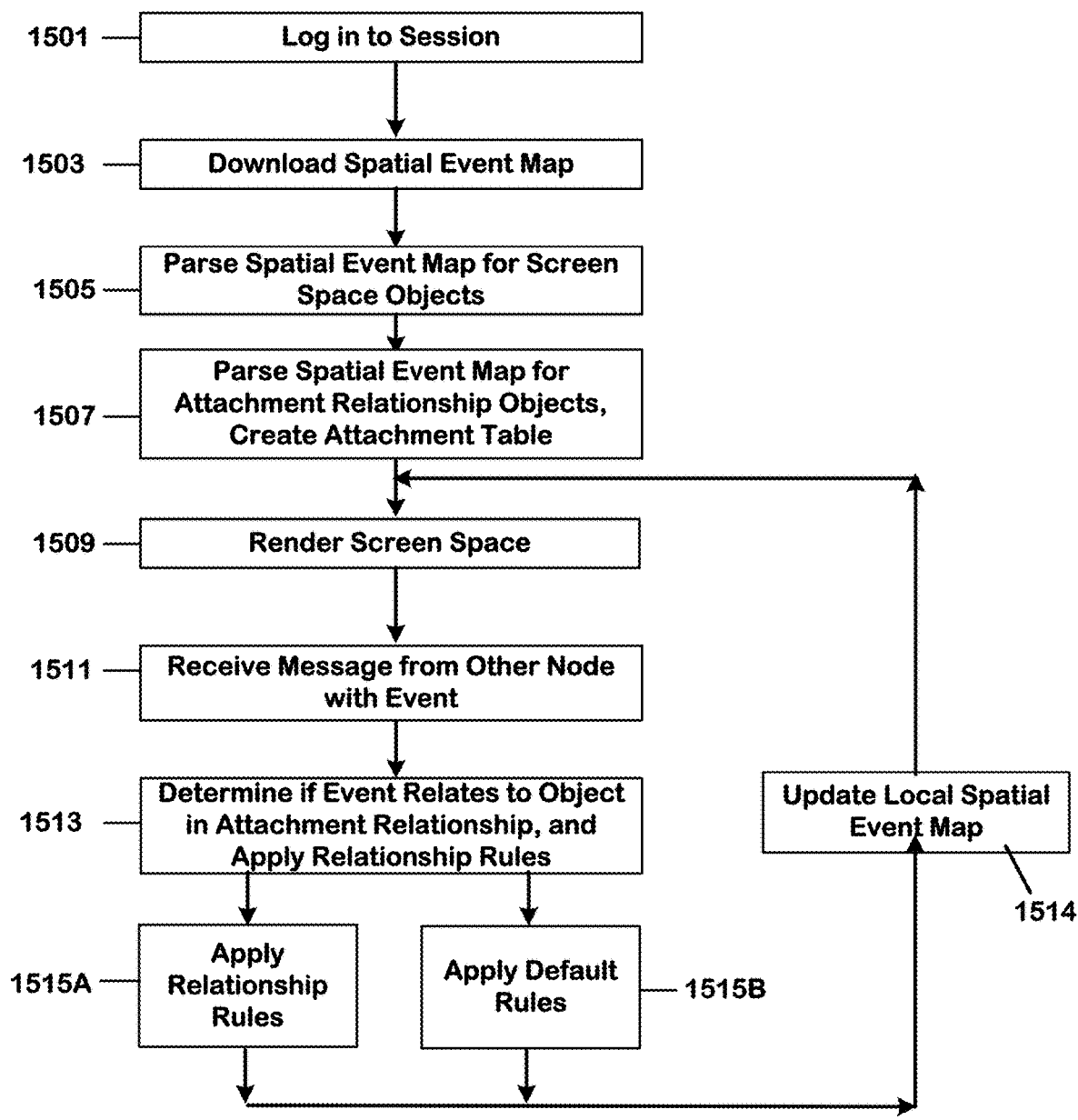
FIG. 13 is a simplified flow chart showing logic for handling relationship record related events received at a client-side node from other nodes.

FIG. 13 illustrates one example of logic implemented using a computer program stored in a storage subsystem and executed by a client-side node relating to relationship based processing as described herein, for events indicated in messages received from other nodes. The process includes logging into a session for a workspace 1501. After logging in, the spatial event map for the session is downloaded to the client-side node 1503. The client-side node parses the spatial event map for objects (graphical target of events) in the viewport which maps to the screen space on the client-side node 1505. The client-side node can also parse the spatial event map to identify relationship records, including attachment relationship records and form tables to facilitate use of the objects in rendering the screen space and changes in the screens space. The attachment table can be created for use with the local logic and for maintaining this information for use in interpreting events which are identified in messages received from other nodes and user inputs which are received from user input devices at the client-side node 1507.

Using the information produced by parsing the spatial event map, the screen space on the client-side node is rendered, resulting in display of the graphical targets within the viewport 1509. During the session, a message can be received from another node which identifies an event executed in the workspace 1511. The client-side node determines if the event carried in the message relates to objects in an attachment relationship 1513, and if so applies attached group rules to interpreting the event 1515A. If the event does not relate to an object in an attachment relationship, then default rules are applied 1515B. The event is added to the local version of the spatial event map 1514, and the screen space is rendered in viewport 1509 with the updated information if necessary. Also, the attachment relationship record and attachment table are updated if necessary in response to the received event 1515.

Figure 14:
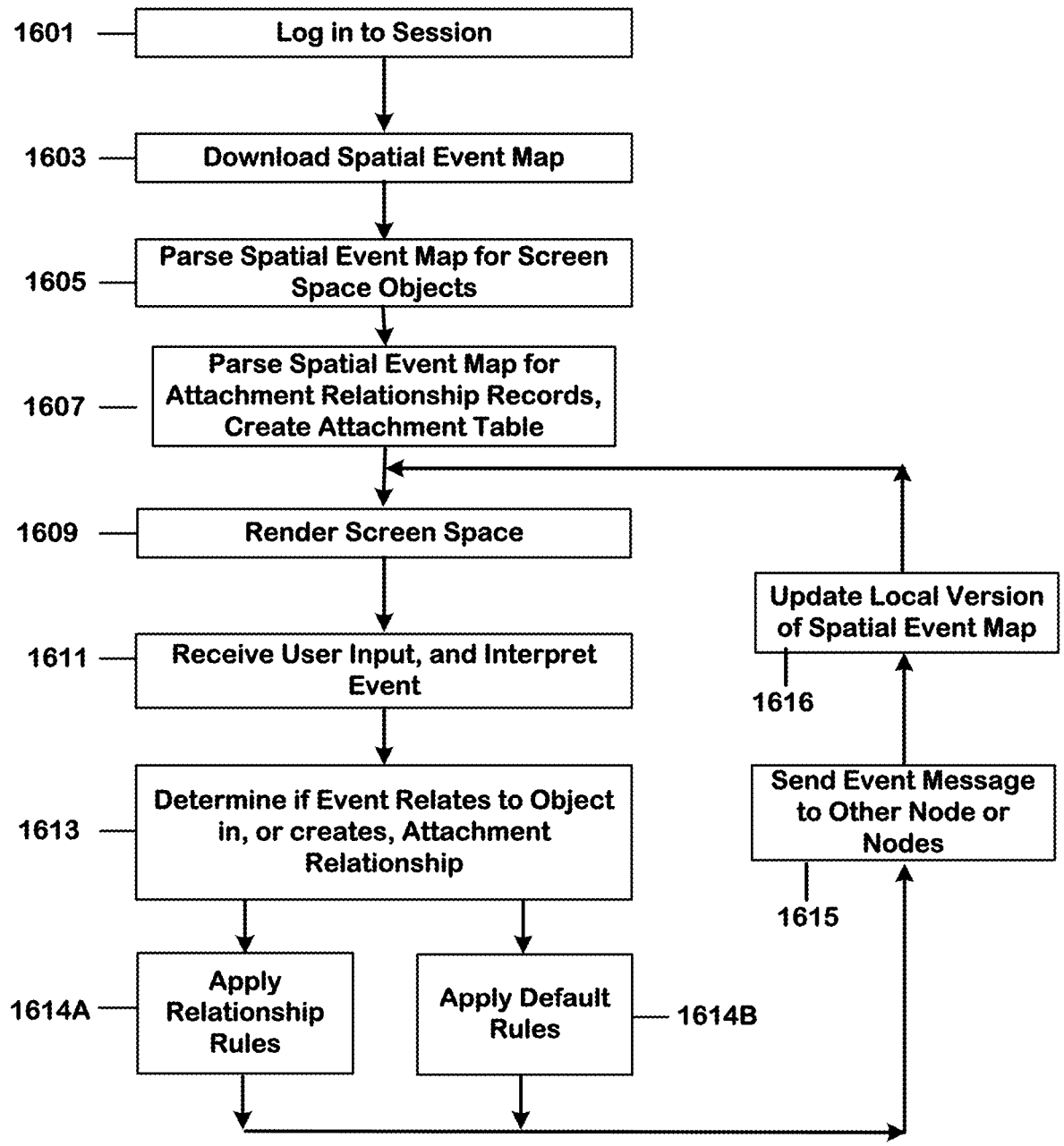
FIG. 14 is a simplified flow chart showing logic for handling relationship record related events received at a client-side node from local user input.

FIG. 14 illustrates logic implemented in a computer program stored in a storage subsystem and executed by a client-side node related to attachment relationship processing as described herein, for inputs generated locally at the client-side node. The process includes logging in to a session for a workspace 1601. After logging in the spatial event map for the session is downloaded to the client-side node 1603. The logic on the client-side node parses the spatial event map for screen space objects, that is objects (graphical target of events) having locations in the viewport which maps to the screen space on the client-side node 1605. Logic on the client-side node also parses the spatial event map for attachment relationship records, and creates an attachment table as mentioned above 1607.

Using the information produced by parsing the spatial event map, the screen space on the client-side node is rendered, resulting in display of the graphical targets within the viewport 1609. During the session, user input generated at the client-side node, such as touch events, gestures, keyboard inputs, mouse inputs and the like, is received and interpreted 1611. The logic on the client-side node determines whether the input relates to objects in an attachment relationship 1613. If it is related, then attachment relationship rules are applied to the interpretation of the input 1614A. If it is not related, then the default rules are applied to the interpretation of the input 1614B. On interpretation of the input, a message is composed and sent to other nodes 1614, including the server-side node at which a persistent version of the spatial event map is maintained. Also, the local version of spatial event map on the client-side node is updated if necessary 1616.

If the event involves a graphical target within the screen space, then the screen space is rendered again using the new information in viewport 1609.

API

An example of components of an API supporting the spatial event map processes described herein are provided.
1) Message Structure
The first element of each message array is a sender-id, specifying the client that originated the message. Sender-ids are unique among all sessions on the server. The id and cr messages sent from the server to the client have their sender-id set to a default value, such as −1. The second element of each message array is a two-character code. This code defines the remaining arguments in the array as well as the intended action. Messages sent with a sender-id of −1 are messages that originate from the server.

Message Types
The following messages types are officially supported.

| | |
|---|---|
| 1) cs | Change Session |
| 2) echo | Echo |
| 3) error | Error |
| 4) id | Client Id |
| 5) jr | Join Room |
| 6) rl | Room List |
| 7) un | Undo |
| 8) up | User Permissions |
| 9) vc | Viewport Change |
| 10) he | History Event |
| 11) ve | Volatile Event |
| 12) disconnect | Disconnect |
| 13) ls | List Streams |
| 14) bs | Begin Stream |
| 15) es | End Stream |
| 16) ss | Stream State |
| 17) oid | Object Id Reservation |

2) vc Viewport Change
Updates other clients in a session that one client's viewport has changed. This is designed to support the "jump to user's view" and "follow me" features. Clients must send a vc upon entering a session for the first time. This ensures that other clients will be able to follow their movements. When processing incoming vc events, clients must keep a cache of viewports, keyed by client ID. This is in order to handle occasions where room list membership (rl) events with missing viewports arrive after associated vc events. A change in a target viewport to a revised target viewport can includes a change in the size of the viewport in one or the other dimension or both, which does not maintain the aspect ratio of the viewport. A change in a target viewport can also include a change in the page zoom of the viewport. When subject client-side viewports in "jump to user's view" or "follow-me" mode receive a first 'vc' record, it is an instruction for mapping a displayable area of the subject client-side viewport to the area of a target viewport. A subsequent 'vc' record results in a remapped displayable area of the subject client-side viewport to the target viewport. When the "jump to user's view" or "follow me" feature is disabled, the subject client-side viewport returns to its prior window.
// server↔client
[sender-id, "vc", viewport-rect]
   viewport-rect an array in the form [x1, y1, x2, y2] representing the section of the workspace viewable on the sending client.
3) he History Event
History events are pieces of data that are persisted to the database. Any information that is necessary for recreating a visual workspace should be sent to the collaborative service via he messages.

EXAMPLES

Creation of notes, images, and other widgets
Moving widgets
Setting or updating attributes of widgets (e.g. note text, marker locations)
Deleting widgets
When the server receives a history event it does the following:
Assign the event an unique id
Persist the event to the database
Broadcast the event, with its id, to all clients connected to the workspace
Establishing an Attachment Relationship record
Updating an Attachment Relationship record History Event Basic Message Format
// server←client
[client-id, "he", target-id, event-type, event-properties]
    client-id (string) the ID of the originating client
    target-id (string) the ID of the target object/widget/app to which this event is relevant
    event-type (string) an arbitrary event type
    properties (object) a JSON object describing pertinent key/values for the event
        regionId (string) the canvas region identifier if the object is created in a canvas region (optional, will be included if it was included in the history event sent by the client)

All properties included in a message will be stored on the server and echoed back to clients. They will also be included in the history sent over http.
// server→client
[client-id, "he", target-id, event-id, event-type, event-properties]
    client-id (string) the ID of the originating client
    target-id (string) the ID of the target window to which this event is relevant
    event-id (string) the ID of the event in the database
    event-type (string) an arbitrary event type
    properties (object) a JSON object describing pertinent key/values for the event, including a time value
        regionId (string) the canvas region identifier if the object is created in a canvas region (optional, will be included if it was included in the history event sent by the client)

Batch History Events

In order to ensure ordering of tightly coupled events, many can be sent in a batch message by changing the event payload to be an array of event payloads.
// server←client
[client-id, "bhe", [event1, event2, event3, event4]]

In this case, each event is a packet send as a standard web socket history message.
The event structure is:
[targetId, eventType, props]

So, the clientId portion is not repeated, but all else is as a standard event.

Example History Event Types

| | |
|---|---|
| create | Add a widget to the workspace |
| delete | Remove the widget from the workspace |
| position | Update the size or location of the widget in the workspace |
| template | Change a card template (background color) |
| membership | Update the target children. Used for groups. |
| pin | Pin or unpin a widget |
| stroke | Add a pen or eraser stroke to a widget |
| text | Sets or update the text and/or text formatting of a note. |
| markercreate | Creates a location marker |
| markermove | Moves an existing location marker |
| markerdelete | Deletes an existing location marker |
| tsxappevent | Used for creating, deleting, and updating tsx widgets such as web browsers |
| navigate | Used for navigating to different page inside group documents (MS docs/PDF) |
| attachment relationship create | Used for establishing an attachment relationship record. |
| attachment relationship update | Used for changing an attachment relationship record. |

Create

Clients send 'create' to the collaboration server to add a widget to a workspace. For 'create' messages the target-id is the id of the containing element, usually the workspace-id.

Generic Widget Create Example

```
// client --> server
[client-id, "he", workspace-id, "create", {
    "id":"5123e7ebcd18d3ef5e000001",
    "type":"widget",
    "regionId":null
}]
```

Props

| | |
|---|---|
| id (string) | unique identifier for the widget |
| type (string) | the type of widget |
| regionId (string) | the canvas region if the object is created in a canvas region |

Most widgets will also have a location property, usually a rect and order, but potentially a point or other representation.

Card Create Example

```
// client --> server
[client-id, "he", workspace-id, "create", {
    "id":"5123e7ebcd18d3ef5e000001",
    "baseName":"sessions/all/Teal",
    "ext":"JPEG",
    "rect":[-1298,-390,-1018,-230],
    "actualWidth":560,
    "actualHeight":320,
    "order":4,
    "type":"note",
    "regionId":null,
    "hidden":false,
    "text":"some text for the note",
    "styles": {
        "font-size" : "42px",
        "font-weight" : "400",
        "text-transform" : "inherit"
    }
}]
```

Props

| | |
|---|---|
| id (string) | unique identifier for the window |
| baseName (string) | the background image file name |
| ext (string) | the background image file extension |
| rect (object) | the location of the window |
| actualWidth (int) | the background image width in pixels |
| actualHeight (int) | the background image height in pixels |
| order (int) | z order |
| type (string) | "note" for objects that can have text, "image" for other objects |
| regionId (string) | the canvas region if the object is created in a canvas region |
| hidden (boolean) | whether the window is currently hidden |
| text (string) | the text contained in the note (optional) |
| styles (object) | style for the text contained in the note (optional) |

PDF Create Example

```
// server --> client
[client-id,
 "he",
 target-id,
 event-id,
 "create",
 {"type":"pdf",
   "id":"5307ec25a294d9250bf65fce",
     "assetPath":"sessions/objects/s7t6mNHxfpqWxAYqYXLF/
     5307ec25a294d9250bf65fce.pdf",
   "rect":[1770,284,2994,1076],
   "actualWidth": 1224,
   "actualHeight": 792,
   "filename":"5617_FSPLT1_018078.pdf",
   "title":"Record of Decision",
   "hidden":false,
   "pin":false
   "pages":73}]
```

Props

| | |
|---|---|
| type (string) | "pdf" |
| id (string) | unique identifier for the pdf |
| assetPath (string) | the location of this asset on the asset server. Use configuration service to get the asset base path. |
| rect (object) | the location of the window in the workspace |
| actual Width (int) | the width of the widest page in the pdf, combined with actualHeight to build "bounding box" |
| actualHeight (int) | the height of the tallest page in the pdf, combined with actual Width to build "bounding box" |
| filename (string) | the original file name of the pdf |
| order (int) | z order |
| hidden (boolean) | whether the window is currently hidden |
| pin (boolean) | whether the pdf is pinned in one location on the workspace |
| regionId (string) | the canvas region if the object is created in a canvas region (optional) |

Attachment Relationship Create (See Above)
Attachment Relationship Update (See Above)

Generic Widget Position Example

```
// server→client
[client-id, "he", workspace-id, event-id, "pin", {"pin": true}]
```
Props
  pin (boolean) true is pin, false is un-pin Stroke
  Used to add a stroke to a widget or to the workspace background.

Generic Stroke Example

```
// server <-- client
[client-id, "he", target-id, "stroke", {
    "size": 10,
    "brush": 1,
    "color": [255, 153, 0, 1],
    "locs": [850, 616, 844, 617],
    "regionId": 59.1
}]
// server --> client
[client-id, "he", target-id, event-id, "stroke", {
    "size": 10,
    "brush": 1,
    "color": [255, 153, 0, 1],
    "locs": [850, 616, 844, 617],
    "regionId": 59.1
}]
```

Props

| | |
|---|---|
| size (integer) | diameter of the stroke using the coordinate space of the containing object. Strokes on the canvas are sized in world space, while strokes on widgets are sized in their parent widget space. |
| brush (integer) | the brush type to use when rendering the stroke. 1 is the draw brush, while 2 is the erase brush. |
| color (numbers) | r/g/b/a values for the color of the stroke. Ignored for erase strokes (although may still be present). |
| locs (array) | stroke locations in the format: [10, 1, 10, 2, 12, 3] where coordinates are paired [x, y, x, y, x, y, ...] in an array. Similar to size, locations are in the coordinate space of the containing object. |
| regionId (string) | the canvas region if the stroke is created in a canvas region (optional). |

Rendering note: strokes should be rendered with end caps centered on the first and last points of the stroke. The end cap's diameter should be equal to the brush size. Rendering end caps is the responsibility of each client.

Text
  Set the text and style of text on a widget. Both the text attribute and style attribute are optional.

Generic Test Example

```
// server <-- client
[client-id, "he", target-id, "text", {
    "text" : "abcdef",
    "styles" : {"font-size" : "42px","font-weight" : "400",
    "text-transform": "inherit"}
}]
// server --> client
[client-id, "he", target-id, event-id, "text", {
    "text" : "abcdef",
    "styles" : {
        "font-size" : "42px",
        "font-weight" : "400",
        "text-transform" : "inherit"
    }
}]
```

Props

| | |
|---|---|
| text (string) | the text string to show on the widget |
| styles (hash) | the css styles to apply to the text |

Example of Creating a Web Browser

```
// server <-- client
[client-id,"he",new-browser-id,"tsxappevent",{
    "payload": {
        "y":709,
        "x":1517,
        "worldSpaceWidth":800,
        "worldSpaceHeight":600,
        "windowSpaceWidth":800,
        "windowSpaceHeight":600,
```

-continued

```
        "version":1,
        "url":"http://www.google.com/",
        "order":735880
    },
    "messageType":"createBrowser",
    "targetTsxAppId":"webbrowser"
}]
// server --> client
[client-id,"he",new-browser-id, event-id, "tsxappevent", {
    "payload": {
        "y":709,
        "x":1517,
        "worldSpaceWidth":800,
        "worldSpaceHeight":600,
        "windowSpaceWidth":800,
        "windowSpaceHeight":600,
        "version":1,
        "url":"http://www.google.com/",
        "order":735880
    },
    "messageType":"createBrowser",
    "targetTsxAppId":"webbrowser"
}]
```

Props

| | |
|---|---|
| payload (object) | details needed for creating a browser |
| x (number) | the x location of the marker |
| y (number) | the y location of the marker |
| worldSpaceWidth (number) | the width in world space |
| worldSpaceHeight (number) | the height in world space |
| windowSpaceWidth (number) | the width in window space |
| windowSpaceHeight (number) | the height in window space |
| version (number) | #TODO |
| url (number) | the url this browser widget should point to messageType *(string) "createBrowser" for creating browsers targetTsxAppId *(string) "webbrowser" for web browser widgets |

Example of Deleting a Web Browser

```
// client --> server
[client-id,"he",target-id,"tsxappevent",{
    "messageType":"deleteBrowser",
    "targetTsxAppId":"webbrowser",
    "payload":{"version":1}
}]
```

4) ve Volatile Event

Volatile events are not recorded in the database, so they are good for in-progress streaming events like dragging a card around the screen, and once the user lifts their finger, a HistoryEvent is used to record its final place.

Volatile Event Basic Message Format

// server↔client

[client-id, "ve", target-id, event-type, event-properties]

| | |
|---|---|
| client-id (string) | the ID of the originating client |
| target-id (string) | the ID of the target window to which this event is relevant |
| event-type (string) | an arbitrary event type |
| properties (object) | a JSON object describing pertinent key/values for the event |

Example Volatile Event Types

| | |
|---|---|
| sb | Begins a new stroke. |
| sc | Continues a previously started stroke. |
| se | Ends a stroke |
| position | Used to share a position with other clients that should not be persisted. For example show a window being dragged in real time. |
| bf | Begin Follow: User A begins to follow User B. Used to notify User A that user B is following. |
| ef | End Follow: User B is no longer following user A. Used to notify user A that user B is no longer following. |

Workspace

| | |
|---|---|
| sb | Starts a stroke. Used to render strokes on one client while they are being drawn on another client. |
| sc | Continues a previously started stroke by giving another point to include. Used to render strokes while they are being drawn on another client. |
| se | Ends a previously started stroke. |
| bf | Begin Follow: User A begins to follow User B. Used to notify User A that user B is following. |
| ef | End Follow: User B is no longer following user A. Used to notify user A that user B is no longer following. |

Note

| | |
|---|---|
| position | Live updates the position of a note while its being moved by another user. |
| sb | Starts a stroke. Used to render strokes on one client while they are being drawn on another client. |
| sc | Continues a previously started stroke by giving another point to include. Used to render strokes while they are being drawn on another client. |
| se | Ends a previously started stroke. |

Image

| | |
|---|---|
| position | Live updates the position of an image while its being moved by another user. |
| sb | Starts a stroke. Used to render strokes on one client while they are being drawn on another client. |
| sc | Continues a previously started stroke by giving another point to include. Used to render strokes while they are being drawn on another client. |
| se | Ends a previously started stroke. |

Volatile Event Details

The following fields are properties of several volatile events.

| | |
|---|---|
| stroke-id | Stroke-IDs are selected by the client. Currently they are the sender-id composed with an increasing integer, separated by a dot. This is to make it unique within the server context among all clients. |
| target-id | A stroke may be attached to a specific target (container) in the workspace. In the case of a stroke belonging to a widget, the target ID field would contain the ID of the widget. Strokes destined for the main canvas in the workspace are designated by having their target ID be the same as the workspace id. |

Position—ve

Used to broadcast intermediate steps of a window moving around the workspace.

Generic Position Example

```
// server↔client
[client-id, "ve", target-id, "position", {position-info}]
  Props
    position-info—information about the widget's new
      position
```

Window Position Example

```
// server↔client
[client-id, "ve", target-id, "position", {"rect":[-1298,-390,-
1018,-230],"order":4}]
  Props
```

| rect (object) | the location of the target window |
|---|---|
| order (int) | the z-order of the target window | sb

Used to broadcast the beginning of a stroke to the other clients.

```
// server <--> client
[client-id, "ve", target-id, "sb",{
  "brush":1,
  "size":2,
  "color":[214,0,17,1],
  "x":100,
  "y":300,
  "strokeId":"395523d316e942b496a2c8a6fe5f2cac"
}]
```

Props

| x, y (int) | the starting point of this stroke |
|---|---|
| strokeId (string) | the ID of the new stroke | sc:

Continues the stroke specified by the stroke id.

```
// server↔client
[client-id, "ve", target-id, "sc", {"x":100, "y":300,
  "strokeId": "395523 d316e942b496a2c8a6fe5f2cac"}]
```

Props

| x, y (int) | the new end-point of the stroke |
|---|---|
| strokeId (string) | the ID of the new stroke | se:

Ends the stroke specified by stroke-id.

```
// server↔client
[client-id, "ve", target-id, "se", {"strokeId":
"395523d316e942b496a2c8a6fe5f2cac"}]
```

| stroke-id (string) | the ID of the continued stroke |
|---|---|

The API excerpt described above provides one example message structure. Other structures may be utilized as well, as suits a particular implementation.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also, as used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the technology disclosed may consist of any such feature or combination of features. In view of the foregoing description it will be evident to a person skilled in the art that various modifications may be made within the scope of the technology disclosed.

While the technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims. It is contemplated that technologies described herein can be implemented using collaboration data structures other than the spatial event map.

What is claimed is:

1. A system comprising a network node including a display having a physical display space, a user input device, a processor and a communication port, the network node including:

logic to render an interactive whiteboard in a screen space on the physical display space;

logic to access a database recording contents of a workspace, the database including a plurality of graphical objects, entries in the database including identifiers of corresponding graphical objects in the plurality of graphical objects, locations of the corresponding graphical objects in workspace coordinates, and sizes of areas allocated to the corresponding graphical objects targets in the workspace coordinates;

logic to accept input data from the user input device that identifies an input gesture indicating selection of a source graphical object and indicating a termination of the input gesture, and to interpret the input gesture in response to the selection and the termination, and when the termination indicates a location within an area allocated to a target graphical object, then create a relationship record and add the relationship record to the database, the relationship record specifying characteristics for rendering in the screen space of the source graphical object as a function of its relationship to the target graphical object including a link between the source graphical object in the relationship record to the target graphical object to be rendered in the screen space having graphical features identified in the relationship record, an order parameter indicating an order of layering of the graphical objects in the relationship record and relative coordinates of the source graphical object relative to the target graphical object;

the relationship record defining the relationship between the source graphical object in the plurality of graphical objects and the target graphical object in the plurality of graphical objects;

logic to establish communication with one or more other network nodes, and send a message to the one or more other network nodes including an event record identifying creation of the relationship record;

logic to identify graphical objects in the database having locations within a viewport in the workspace coordinates, and whether graphical objects identified within the viewport are the source object of the relationship record; and logic to render the identified graphical objects to locations and sizes of areas within the screen space in the physical display space, including placing the source graphical object of the relationship record in the screen space using the relative coordinates assigned to the source graphical object combined with workspace coordinates assigned to the target graphical object, with layering according to the order parameter.

2. The system of claim 1, the network node comprising logic to accept input data from the user input device that identifies an input gesture indicating selection of one of the source and target graphical objects and indicating a termination of the input gesture, and to interpret the input gesture in response to the selection, the termination and the defined relationship, and wherein when the selection indicates the source graphical object, and the termination indicates a location outside the area allocated to the target graphical object, then the logic interprets the input gesture to disconnect the source graphical object and the target graphical object, and update the relationship record by changing the target object in the relationship record to the workspace.

3. The system of claim 1, the network node comprising logic to accept input data from the user input device that identifies an input gesture indicating selection of one of the source and target graphical objects and indicating a termination of the input gesture, and to interpret the input gesture in response to the selection, the termination and the defined relationship, and wherein when the selection indicates the source graphical object, and the termination indicates a location outside the area allocated to the target graphical object and over an area allocated to a third graphical object, then interpreting the input gesture to disconnect the source graphical object and the target graphical object, and update the relationship record by changing the target graphical object to the third graphical object.

4. The system of claim 1, the network node comprising logic to accept input data from the user input device that identifies an input gesture indicating selection of one of the source and target graphical objects and indicating a termination of the input gesture, and to interpret the input gesture in response to the selection, the termination and the defined relationship, and wherein when the selection indicates the target graphical object, and the termination indicates a change in location of the target graphical object, then interpreting the input gesture to change the location allocated to the target graphical object.

5. The system of claim 1, the network node comprising logic to accept input data from the user input device that identifies an input gesture indicating selection of one of the source and target graphical objects and indicating a termination of the input gesture, and to interpret the input gesture in response to the selection, the termination and the defined relationship, and wherein when the selection indicates the target graphical object, and the termination indicates a change in zoom level of the target graphical object, then interpreting the input gesture to change the area allocated to the target graphical object, and to update the location and area allocated to the source graphical object according to the defined relationship.

6. The system of claim 1, the network node comprising logic to accept input data from the user input device that identifies an input gesture indicating selection of a third graphical object and target graphical objects and indicating a termination of the input gesture within an area allocated to a fourth graphical object, and to interpret the input gesture in response to the selection, and the termination, and to create another relationship record, defining a relation between a third graphical object as a source object and the fourth graphical object as a target object.

7. The system of claim 1, wherein the logic to access a database comprises logic to:

download a copy of the database from one of the other network nodes; and accept messages from other network nodes including events defining creation of relationship records, and to add one of the event and the created relationship record to the database.

8. A method for operating a network node in an electronic whiteboard system, the network node including a display having a physical display space, a user input device, a processor and a communication port, the method comprising:

accessing a database recording contents of a workspace, the database including a plurality of graphical objects, entries in the database including identifiers of corresponding graphical objects in the plurality of graphical objects, locations of the corresponding graphical objects in workspace coordinates, and sizes of areas allocated to the corresponding graphical objects targets in the workspace coordinates;

rendering an interactive whiteboard in a screen space on the physical display space using the database;

accepting input data from the user input device that identifies an input gesture indicating selection of a source graphical object and indicating a termination of the input gesture, and interpreting the input gesture in response to the selection and the termination, and when the termination indicates a location within an area allocated to a target graphical object, then creating a relationship record and adding the relationship record to the database, the relationship record specifying characteristics for rendering in the screen space of the source graphical object as a function of its relationship to the target graphical object including a link between the source graphical object in the relationship record to the target graphical object to be rendered in the screen space having graphical features identified in the relationship record, an order parameter indicating an order of layering of the graphical objects in the relationship record and relative coordinates of the source graphical object relative to the target graphical object;

the relationship record defining a relationship between the source graphical object in the plurality of graphical objects and the target graphical object in the plurality of graphical objects;

establishing communication with one or more other network nodes, and sending a message to the one or more other network nodes including an event record identifying creation of the relationship record;

identifying graphical objects in the database having locations within a viewport in the workspace coordinates, and whether graphical objects identified within the viewport are the source object of the relationship record; and rendering the identified graphical objects to locations and sizes of areas within the screen space in the physical display space, including placing the source graphical object of the relationship record in the screen space using the relative coordinates assigned to the source graphical object combined with workspace coordinates assigned to the target graphical object, with layering according to the order parameter.

9. The method of claim 8, including accepting input data from the user input device that identify an input gesture indicating selection of one of the source and target graphical objects and indicating a termination of the input gesture, and interpreting the input gesture in response to the selection, the termination and the defined relationship, and wherein when the selection indicates the source graphical object, and the termination indicates a location outside the area allocated to the target graphical object, then interpreting the input gesture to disconnect the source graphical object and the target graphical object, and update the relationship record by changing the target object in the relationship record to the workspace.

10. The method of claim 8, including accepting input data from the user input device that identify an input gesture indicating selection of one of the source and target graphical objects and indicating a termination of the input gesture, and interpreting the input gesture in response to the selection, the termination and the defined relationship, and wherein when the selection indicates the source graphical object, and the termination indicates a location outside the area allocated to the target graphical object and over an area allocated to a third graphical object, then interpreting the input gesture to disconnect the source graphical object and the target graphical object, and update the relationship record by changing the relation to make the third graphical object the parent object.

11. The method of claim 8, including accepting input data from the user input device that identify an input gesture indicating selection of one of the source and target graphical objects and indicating a termination of the input gesture, and interpreting the input gesture in response to the selection, the termination and the defined relationship, and wherein when the selection indicates the target graphical object, and the termination indicates a change in location, then interpreting the input gesture to change the location allocated to the target graphical object, and to update the location of the source graphical object according to the relationship defined in the relationship record.

12. The method of claim 8, including accepting input data from the user input device that identify an input gesture indicating selection of one of the source and target graphical objects and indicating a termination of the input gesture, and interpreting the input gesture in response to the selection, the termination and the defined relationship, and wherein when the selection indicates the target graphical object, and the termination indicates a change in zoom level, then interpreting the input gesture to change the area allocated to the target graphical object, and to update the location and area allocated to the source graphical object according to the relationship defined in the relationship record.

13. The method of claim 8, including accepting input data from the user input device that identify an input gesture indicating selection of a third graphical object and target graphical objects and indicating a termination of the input gesture within an area allocated to a fourth graphical object, and interpreting the input gesture in response to the selection, and the termination, and then creating another relationship record defining a relation between a third graphical object as a source graphical object and the fourth graphical object as a target graphical object, and defining a position of the source graphical object relative to the target graphical object.

14. The method of claim 8, wherein the accessing a database comprises:

downloading a copy of the database; and further including:

accepting messages from other networks nodes including events defining creation of relationship records, and adding one of the event and the created relationship record to the database.

15. A computer program product for a system comprising a display having a physical display space, a user input device, a processor, memory and a communication port, comprising:

instructions executable by the system and stored in non-transitory memory, the instructions implementing logic to execute the method of claim 8.

* * * * *